US011381780B2

(12) United States Patent
De Bonet et al.

(10) Patent No.: US 11,381,780 B2
(45) Date of Patent: Jul. 5, 2022

(54) ITEM-IDENTIFYING CARTS

(71) Applicant: Amazon Technologies, Inc., Seattle, WA (US)

(72) Inventors: Jeremy Samuel De Bonet, Southborough, MA (US); Nicholas McMahon, Bolton, MA (US); Oded Maron, Sudbury, MA (US); Jonathan Cohn, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/284,130

(22) Filed: Feb. 25, 2019

(65) Prior Publication Data

US 2020/0275059 A1   Aug. 27, 2020

(51) Int. Cl.
| | | |
|---|---|---|
| H04N 7/18 | (2006.01) | |
| G06Q 30/06 | (2012.01) | |
| H04N 5/225 | (2006.01) | |
| H04N 5/247 | (2006.01) | |
| G06V 20/52 | (2022.01) | |

(52) U.S. Cl.
CPC ......... *H04N 7/181* (2013.01); *G06Q 30/0633* (2013.01); *G06Q 30/0641* (2013.01); *G06V 20/52* (2022.01); *H04N 5/2256* (2013.01); *H04N 5/247* (2013.01)

(58) Field of Classification Search
CPC ....... H04N 7/181; H04N 5/2556; H04N 5/247
USPC ....................................................... 348/150
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,373,322 B1* | 8/2019 | Buibas | G06K 9/00201 |
| 10,383,461 B2 | 8/2019 | Zakirov et al. | |
| 2008/0231432 A1* | 9/2008 | Stawar | B62B 3/1424 |
| | | | 340/425.5 |
| 2013/0284806 A1 | 10/2013 | Margalit | |
| 2015/0019391 A1* | 1/2015 | Kumar | G06Q 10/087 |
| | | | 705/28 |

(Continued)

OTHER PUBLICATIONS

PCT Search Report and Written Opinion dated May 29, 2020 for PCT Application No. PCT/US2020/019263, 11 pages.

(Continued)

*Primary Examiner* — Nasser M Goodarzi
*Assistant Examiner* — Jaycee Imperial
(74) *Attorney, Agent, or Firm* — Lee & Hayes, P.C.

(57) ABSTRACT

This disclosure is directed to an item-identifying cart that may be utilized by a user in a materials handling facility to automatically identify items that the user places in their cart, and update a virtual shopping cart to include items taken by the user. The mobile cart may include four capture assemblies that are disposed proximate to each of the four corners of a basket of the cart, and oriented such that their respective optical axes are directed towards an interior of a perimeter of the top of the basket, and above the top of the basket. The capture assemblies may include proximity sensors that are used to detect movement above the top of the basket, LEDs that illuminate items, and cameras that generate image data representing the items as they are placed in, or removed from, the cart.

20 Claims, 10 Drawing Sheets

(56) References Cited

U.S. PATENT DOCUMENTS

| | | | |
|---|---|---|---|
| 2015/0371520 A1* | 12/2015 | DeLean | G06K 9/00369 |
| | | | 382/103 |
| 2017/0158215 A1* | 6/2017 | Phillips | B60B 19/00 |
| 2018/0197218 A1* | 7/2018 | Mallesan | G06K 17/0022 |
| 2018/0315865 A1* | 11/2018 | Haist | H04N 5/217 |
| 2019/0230324 A1* | 7/2019 | Chien | F21V 14/02 |
| 2020/0034614 A1* | 1/2020 | Utsumi | G06Q 20/208 |

OTHER PUBLICATIONS

International Report on Preliminary Patentability for PCT App No. PCT/US20/19263, dated Sep. 2, 2021, 9 pages.

\* cited by examiner

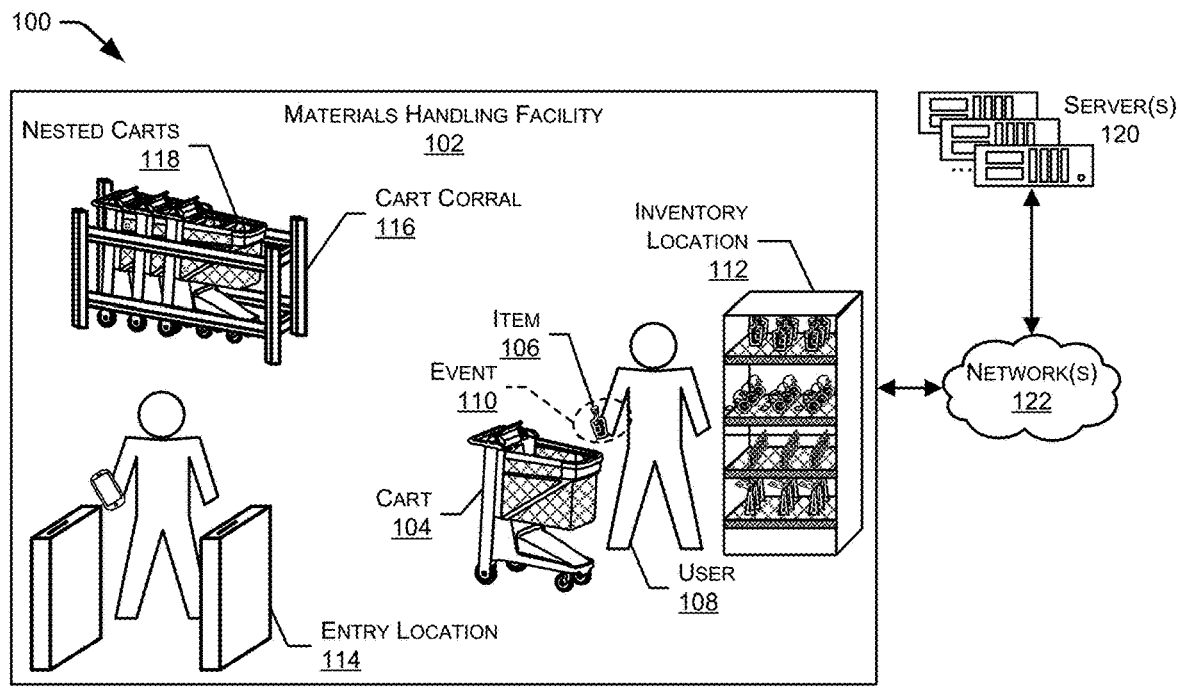
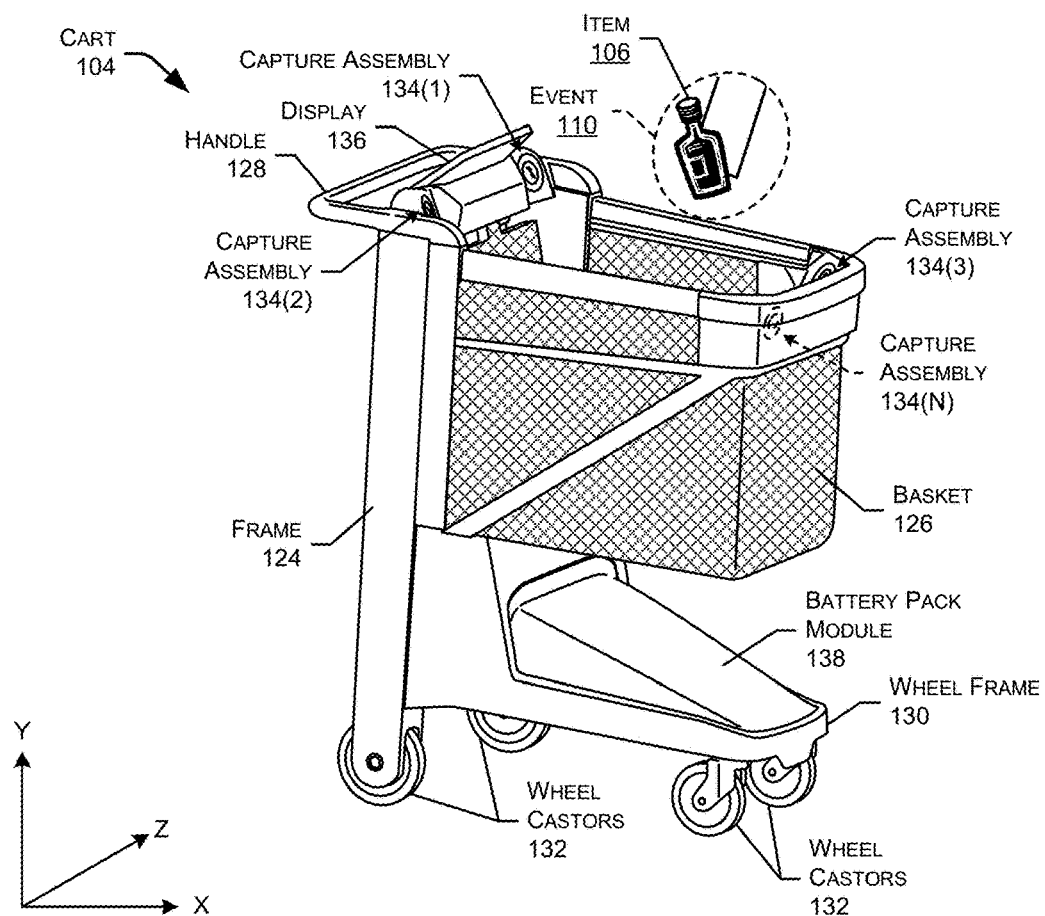
FIG. 1

ITEM-IDENTIFYING CARTS

BACKGROUND

Materials handling facilities, such as warehouses or retail stores, often provide users with carts to facilitate the processes by which the users locate, identify, retrieve, and transport items at the facilities. For example, when a user identifies an item that he or she desires on a shelf or other location within a materials handling facility, the user may remove the item from the shelf or other location, and place the item into a receptacle of a cart before the user continues to travel through the facility in search of additional items. The cart may have a durable frame or structure that is configured to travel on wheels such that users are able to fill the carts with numerous, and potentially heavy, items they desire, and use the mobile cart to transport the items around the materials handling facilitate with ease, rather than having to carry the items.

Traditionally, when the user has finished identifying and retrieving the items he or she desires, the user may transport the items in the cart to a check-out destination within the materials handling facility, such as a distribution station, a cashier, or a dedicated self-checkout stand, and transition the items to a human operator or an automated agent. Typically, the user or the human operator manually removes the items from the cart, scans or otherwise registers the items with the user, and places the items into one or more bags or other item carriers. The user may then use the bags or other item carriers to transport the items to another destination (e.g., to an automobile, workstation, or home) by manually carrying the item carriers to the other destination, or by transporting the item carriers to the destination within the cart.

Thus, retrieving items from shelves or other locations within a materials handling facility, and placing the items into bags or other carriers for transportation to their desired destination (e.g., automobile or home), may be a two-step process. First, the items must be retrieved from the shelves or other storage locations and placed into the cart, and second, the items must be removed from the cart, scanned, and placed into a bag or other item carrier. These intervening actions that are required to transition items from a shelf or other storage location into the bags or other item carrier necessarily slows the process by which items are retrieved from a materials handling facility, and tend to mitigate the advantages that carts provide.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates an example environment of a materials handling facility that includes an item-identifying cart to identify items placed in, and removed from, a basket of the cart by a user. The cart uses one or more proximity sensors to detect an item, utilizes one or more cameras to generate image data depicting the item, analyzes the image data to identify the item, and updates a virtual shopping cart using the item identifier.

DETAILED DESCRIPTION

Figure 2B:
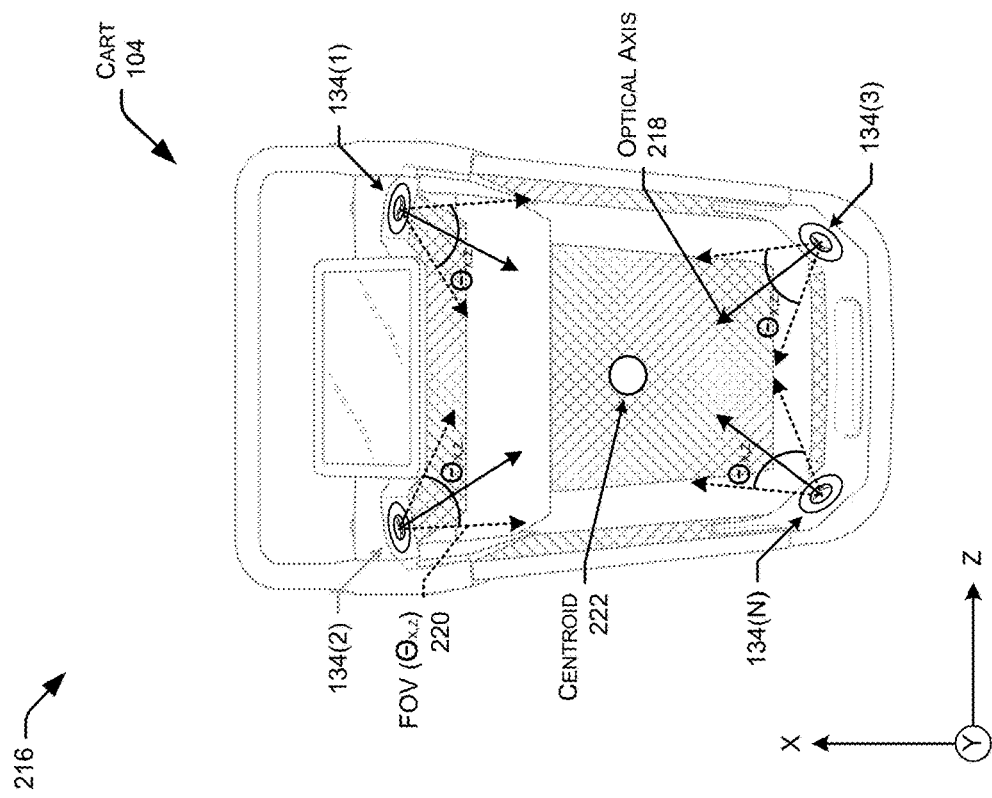
FIGS. 2A-2D illustrate example views an item-identifying cart that has capture assemblies for identifying items placed in the cart.

This disclosure is directed to item-identifying carts that may be utilized by users in material handling facilities to automatically identify items that the users place in their carts as they move around the material handling facilities. Upon identifying items, the item-identifying carts may update virtual shopping carts for the users to represent the items that have been placed in, or removed from, the physical carts. According to the techniques described herein, an item-identifying cart (or "smart cart") may include one or more cameras positioned on a frame of the cart to generate image data representing items that a user places in the cart, and/or removes from the cart. The cart may include one or more components that analyze the image data to determine an item identifier for the item(s) placed in the cart, or removed from the cart, and update a virtual shopping cart for the user of the cart. Once a user has finished their shopping session, the user may be able to efficiently check-out of the materials handling facility (or "facility") without having to scan or otherwise register their items with a cashier or at a designated self-checkout stand. In some examples, the user may simply depart the facility with their items and entirely avoid a traditional checkout experience of a facility, such as a grocery store. For instance, the user may have registered for a user account with the facility that is automatically charged for purchases of the items listed in a virtual shopping cart of the user that were identified by the cart during the user's shopping session.

Similar to traditional carts, such as shopping carts commonly found at grocery stores or other retail establishments, the item-identifying carts described herein may include a durable frame, including or supporting a basket, made of plastic or metal (often having four sides in a quadrilateral shape), multiple wheel castors configured to allow the cart to move on a surface, and handle for a user to push the cart around in a facility. However, the carts described herein may include additional hardware and software components that configure the carts to, among other functions, identify items placed in the carts on behalf of the users, and update virtual carts of the users to automate one or more steps of a traditional shopping experience.

For example, an item-identifying cart may include at least one camera (or other imaging sensor), memory that stores software components for identifying items and other operations for managing virtual shopping carts, at least one processor to execute the software components, and at least one battery to power the components of the cart. The camera(s) may be positioned in or on the frame of the cart such that an optical axis of the camera is directed towards a location where image data generated by the camera represents or captures items that are placed in the cart, and removed from the cart, by a user. The image data may be analyzed by the software component(s) of the cart using one or more image processing techniques, such as text recognition, object recognition, and/or any other technique. The software component(s) may identify or determine item identifiers for the items represented in the image data, and also determine whether the user is adding items to the cart, or removing items from the cart, and update a virtual shopping cart for the user's shopping session (e.g., add an item to a list of items to be purchased by the user, or remove an item from the list of items to be purchased). In this way, the cart may identify and track items that are retrieved from different locations within the facility, and maintain a virtual shopping cart, or virtual list, of the items selected by the user to provide a more seamless and efficient checkout experience for the user.

In some examples, the cart may have a frame that includes, or supports, a basket comprising a bottom having quadrilateral shape, four sides protruding from the bottom to define an interior cavity, and a top having a perimeter that defines an opening to receive items placed in the interior cavity of the basket. One or more cameras may be positioned on the basket of the cart to generate image data representing the items placed in the cart. In some examples, the cameras may be included in respective capture assemblies that include other components, such as light emitting diodes (LEDs) to active and emit light on the items such that the items are illuminated in the image data to help improve processing of the image data to identify the items.

Although the capture assemblies may be positioned anywhere on the cart, in some examples, the basket of the cart may have capture assemblies disposed proximate to each of the four corners of the perimeter of the top of the basket. In this way, the entire cart may be represented in the various field-of-views (FOVs) of the cameras, which also may not be obstructed as the basket of the cart fills up with items. The capture assemblies may, in some examples, be internal to the basket, or otherwise define a relatively small protrusion from the form-factor of the basket, such that the carts may still be capable of "nesting" together in a line when stored at a facility, similar to traditional shopping carts.

Due to the battery life constraints of the cart, it may be advantageous to refrain from having the cameras and/or LEDs in each of the camera assemblies operating for large periods of time to detect an image being placed in the cart. Thus, in some examples the capture assemblies may additionally include respective proximity sensors (e.g., time-of-flight (ToF) sensors, passive infrared (PIR) sensors, etc.) that generate sensor data to detect movement of an item in, or out, of the cart while the cameras and LEDs are de-activated or in a low-power state. In this way, proximity sensors, which may consume less power than the cameras and/or LEDs, may detect movement proximate the cart before the cameras and/or LEDs are activated.

Thus, the cart described herein may include four capture assemblies disposed at or proximate to the four corners of the perimeter of the basket of the cart. To detect items placed in the cart, or removed from the cart, the capture assemblies may have respective optical axes (e.g., imaginary line along which light propagates through the capture assembly) that are oriented towards an interior of the perimeter of the top of the cart (e.g., towards the middle or centroid of the perimeter of the cart). By orienting the capture assemblies inward with respect to the perimeter of the top of the cart, only items that pass through (e.g., in or out) of the opening of the basket may be represented in image data of the cameras.

The capture assemblies may additionally be oriented to face in a particular vertical direction. For instance, the optical axes of the capture assemblies may, in some examples, be directed downward towards the bottom of the basket to identify when items are placed in the bottom of the basket, or taken from the bottom of the basket. However, because users of the carts may not need to remove items from the cart to be scanned before leaving the facility, it may be advantageous for users to place one or more bags, or other item carriers, in the cart before their shopping session. In this way, users may simply retrieve items from shelves or other storage locations during their shopping session, place the items directly into their bags/item carriers, and remove the bags/item carriers from the carts once they have finished their shopping session for a more seamless shopping experience. Accordingly, the basket of the cart may be sized such that one or more bags provided by the facility, and/or by the users themselves, fit efficiently in the bottom of the basket to help maximize storage space of the interior cavity the cart. In such examples, the bags/item carriers may at least partially occlude the FOVs of the cameras such that the items are difficult or impossible to identify using image data from the cameras.

Accordingly, in some examples the optical axes of the capture assemblies may be directed upward relative to the top of the basket of the cart. For example, the top of the basket of the cart may be disposed in a substantially horizontal plane. The optical axes of the capture assemblies may be directed along the horizontal plane, or upward relative to the horizontal plane, such that the proximity sensors detect the items, and the cameras generate image data representing the items, while the items are at or above the top of the basket (and prior to being placed in a bag or other item carrier). Accordingly, the optical axis of the four capture assemblies may be directed towards an interior of the perimeter of the top of the basket (e.g., towards a middle or centroid of the perimeter of the basket), and upward relative to a horizontal plane in which the top of the basket is disposed. In this way, the FOVs for each of the cameras and/or proximity sensors in the capture assemblies may at least partially overlap at a location above, and potentially central to, the perimeter of the top of the cart to define a "sweet spot" or "target zone" where items are detected and/or captures by all four of the capture assemblies.

To utilize a smart cart as described above, a user may have registered for a user account with an operator of the facility to utilize various automated management services provided by an operator of the facility. For instance, the user may have registered for a user account to automate payments made for items taken by the user and included a payment means (e.g., credit card, bank account number, etc.), and may have also provided an identification means such that the facility, or carts, can recognize the user. For instance, the user may have registered to identify themselves to the cart using any identification technique, such as presenting an identification means to a camera/scanner (e.g., presenting a driver's license, presenting a facility-issued card, presenting a user identifier via a mobile phone, etc.), speaking a predefined utterance (e.g., a name of the user, a predefined keyword, etc.), and/or looking into a camera for facial recognition. Once a user has identified themselves to a smart cart, the user may begin a shopping session where the smart cart identifies and track items retrieved by the user and placed in the smart cart.

The smart cart may continuously operate the proximity sensors in each of the capture assemblies to detect movement of items above the top of the cart. The proximity sensors may generate sensor data that indicates whether or not an item or object is with a threshold range of distances from the top of the cart (e.g., within 6 inches, within 1 foot, within 2 feet, etc.). The sensor data may be analyzed to detect an item above the perimeter of the top of the cart, and trigger the LEDs to begin illuminating light and the cameras to begin generating image data. The image data generated by the camera may be analyzed by the software components to determine whether or not an item is being placed in the cart, or removed from the cart. For instance, the image data may represent, over time, movement of the item into the cart, or out of the cart. Additionally, the image data may be analyzed using various techniques to determine an item identifier. Various techniques may be utilized to process image data for identifying the item identifier of the item, such as text recognition, object recognition, and/or other techniques. Upon determining the item identifier, such as determining that the item corresponds to "Strawberry Yogurt," the software components on the cart may store an indication that the item identifier was added to the cart, or removed from the cart, and update a virtual shopping cart accordingly.

After the user has moved throughout the materials handling facility and selected the items they desire to purchase or otherwise take from the facility, the user may end the shopping session in various ways. For instance, the user may return the cart to a cart corral, provide input to the cart indicating an end of the shopping session (e.g., utterance, utilize a user interface element on a touch display, etc.), or simply remove their bags or other item carriers from the cart and leave the facility. After the user has ended their shopping session, the list of item identifiers in the virtual shopping cart may be uploaded to one or more remote servers that manage user accounts for users of the facility. The servers may charge the appropriate user account for the listing of the items in the virtual shopping cart that the user took from the facility.

Although some of the techniques described below are performed locally on the cart, in other examples, some or all of the techniques may be performed by one or more backend devices or servers associated with the facility. For instance, the sensor data and/or image data may be collected at the cart and sent over network(s) to backend devices at the facility, or server devices located remote from the facility, to be processed remotely. However, in some instances it may be advantageous for at least some of the processing to be performed on the cart to reduce latency in identifying items placed in the cart. For instance, it may be advantageous to have low latency when requesting that a user provide feedback to help identify an item recently placed in the cart, rather than the user continuing their shopping session and being asked later about an item. Further, while various techniques described below are with reference to purchasing items in a retail facility, the techniques are generally applicable to any materials handling facility in which a user may place items in a cart. For example, although the techniques described herein are primarily with reference to identifying items placed in a cart by a user for the purpose of identifying a user account to charge for items selected from a materials handling facility, the techniques are equally applicable to any industry in which user recognition may be helpful. For instance, the idem-identifying cart may be implemented for distribution centers where employees collect items from various locations to be shipped through the mail system.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility 102 that includes an item-identifying cart 104 to identify items 106 placed in, and removed from, a basket of the cart 104 by a user 108. The cart uses one or more proximity sensors to detect an item 106, generates image data depicting the item 106, analyzes the image data to identify an item identifier for the item 106, determines the event 110 involving the item (e.g., add to cart, remove from cart, multiple items, quantity of items, etc.) and updates a virtual shopping cart using the item identifier.

As FIG. 1 depicts, the user 108 may have engaged in a shopping session in the materials handling facility 102. For instance, the user 108 may have selected an item 106 from an inventory location 112 (e.g., shelf, aisle, etc.) and placed the item 106 in the cart 104 (e.g., shopping cart). The inventory location 112 may house one or more different types of items 106 and the user 108 may pick (i.e., take, retrieve, etc.) one of these items 106.

As illustrated, the materials handling facility 102 (or "facility") may have one or more entry locations 114, such as lanes. The entry location 114 may be defined by a gate in some examples, and may include a movable barrier to control movement of users 108. For example, the gate may include computer-controlled panels that may be closed to impede passage of the users 108 or opened to permit passage of the user 108. Upon entering a facility 102, a user 108 may desire to utilize a cart 104 for their shopping session to transport items 106 around the facility 102 during their shopping session. In such examples, the user 108 may approach a cart corral 116, or other locations, at which carts 104 are stored. In some examples, the cart corral 116 may comprise a structure, such as an aisle, for storing nested carts 118.

Generally, two or more of the carts 104 may be configured to nest or otherwise functionality join with one another, so that the carts 104 may be easily stored in a cart corral 116, and/or transported in bulk. In some examples, the cart corral 116 may provide additional functionality beyond storage. For instance, the cart corral 116 may facilitate charging of the nested carts 118 that are in the cart corral 116. For instance, the cart corral 116 may have various electrical contacts extending along the length of a horizontal and/or vertical member of the corral 116 that, when placed in electrical contact with an electrical contact of the nested carts 118, charge one or more batteries of the nested carts 118. In other examples, power cords may extend from the cart corral 116 that may be plugged into the nested carts 118 to recharge batteries of the nested carts 118 while not in use.

To utilize a cart 104, a user 108 may approach an unused cart that is not currently engaged in a shopping session (e.g., a nested cart 118), and interact with the unused cart 104 to identify themselves to the cart 104 and begin a shopping session. For instance, the carts 104 may include sensors, such as a barcode sensor (e.g., an image sensor such as a camera, photodetector, or other sensing apparatus designed to read a one or two-dimensional barcode) such that when a user 108 presents a user device, or portion thereof, such as the display, to the barcode sensor, the cart 104 may identify the user and corresponding user account for a shopping session. Other types of interaction may be performed by a user 108 to identify themselves to a cart 104 (e.g., uttering a name or other keyword to identify the user 108, presenting the user's face for facial recognition, typing in a password or other user information into a display of the cart 104, and/or any other type of user identification technique).

Once a user has identified themselves to the cart 104, the item-identifying functionality of the cart 104 may be activated such that subsequent items 106 placed in the cart 104 will be identified by the cart 104, and added to a virtual shopping cart for the user 108. As illustrated, a user 108 may move the cart 104 around the facility 102 to one or more inventory locations 112. The user 108 may retrieve items from the inventory location 112, and place the items 106 in the cart 104. Additionally, the use 104 may retrieve items 106 from the cart 104, and put the items 106 back in an inventory location 112, such as when the user 108 changes their mind regarding their desire to purchase or otherwise acquire the item 106. The cart 104 may include various components for identifying item identifiers corresponding to the items 106 placed in the cart, and maintaining a virtual shopping cart for the shopping session of the user 108.

Once the user 108 has finished their shopping session, the user 108 may end the shopping session in various ways. For instance, the user 108 may return the cart 104 to the cart corral 116, provide input to the cart 104 indicating an end of the shopping session (e.g., utterance, utilize a user interface element on a touch display, etc.), or simply remove item bags or other item carriers from the cart 104 and leave the facility 102. After the user 108 has ended their shopping session, the list of item identifiers in the virtual shopping cart may be uploaded to one or more remote servers 120, over one or more networks 122, that manage user accounts for users 108 of the facility 102. The server(s) 120 may charge the appropriate user account for the listing of the items in the virtual shopping cart that the user took from the facility 102. For instance, the server(s) 120 may be configured to determine or generate information indicative of a cost of the items 106 picked by the user 108. Additionally, the server(s) 120 may store payment information (e.g., credit card information, bank account information, etc.) for each user account. In this way, when the user 108 finished their shopping session and the cart 104 sends the listing of item identifiers in the virtual shopping cart over the network(s) 122 to the server(s) 120, the server(s) 120 may be configured to determine a cost or price for all of the listed item identifiers, and charge the user via their payment information for the items 106 selected during their shopping session. In this way, the user 108 need not go through steps of a traditional check-out experience (e.g., waiting in line for a cashier, scanning items with the cashier, paying for items at the cashier, etc.).

The network(s) 122 may include private networks such as an institutional or personal intranet, public networks such as the Internet, or a combination thereof. The network(s) 122 may utilize wired technologies (e.g., wires, fiber optic cable, and so forth), wireless technologies (e.g., radio frequency, infrared, acoustic, optical, and so forth), or other connection technologies. The network(s) 122 is representative of any type of communication network, including one or more of data networks or voice networks. The network(s) 122 may be implemented using wired infrastructure (e.g., copper cable, fiber optic cable, and so forth), a wireless infrastructure (e.g., cellular, microwave, satellite, etc.), or other connection technologies.

The cart 104 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 122 according to the type of protocol or standard being used. As noted above, in some examples, the servers 120 may perform some or all of the operations described below as being performed by the cart 104. While the servers 120 are illustrated as being in a location outside of the facility 102, in other implementations, at least a portion of the servers 122 may be located at the facility 102.

Similar to a traditional shopping cart, and as illustrated in FIG. 1, the cart 104 may generally include or be formed of a frame 124, a basket 126, a handle 128, a wheel frame 130, and one or more wheel castors 132 to enable movement of the cart 104 on a surface. The frame 124, the basket 126, the handle 128, and the wheel frame 130 may be formed from any suitable materials such as plastics, wood, metals, composites or any other combinations of materials. Moreover, frame 124, the basket 126, the handle 128, and the wheel frame 130 may take any form.

The basket 126 may generally be part of the frame 124 and/or supported by the frame 124 (e.g., be welded, fused, adhered, bolted, screwed, molded, or otherwise joined to the frame 124). In some examples, the basket 126 may comprise a grid or lattice-like structure (e.g., a honeycombed arrangement or framework) having one or more bars or members that are welded, fused, adhered, bolted, screwed, molded, stitched or otherwise joined in a substantially perpendicular alignment with respect to one another. The basket 126 may generally be any shape that defines an interior cavity, or receptacle, for receiving items 106 that are placed in the cart 104. The basket 126 may comprise a bottom, multiple sides protruding from the bottom, and a top. As illustrated, the bottom basket 126 may be in the shape of a quadrilateral such that there are four sides protruding from the bottom of the basket 126. Similarly, the top of the basket 126 may be defined according to the quadrilateral shape and have a perimeter with four corners. The perimeter of the top of the basket 126 may define an opening to the interior cavity (or receptacle) of the basket 126 to receive items placed inside the basket 126. In various examples, the perimeter of the top of the basket may be disposed in a substantially horizontal plane (e.g., a plane substantially along the x-axis as illustrated), and the frame 124 may include at least one vertical member that extends downward from the basket 126 to the wheel frame 130 along a substantially vertical plane (e.g., a plane substantially along the y-axis as illustrated).

The wheel frame 130 may support one or more wheel castors 132 to enable movement of the cart 104 along a surface. The wheel casters 132 include one or more wheels, axles, forks, joints or other components which enable the cart 104 to travel on various surfaces. For example, in some implementations each of the wheel casters 132 may include a single wheel provided on an axle within a fork, or two or more wheels provided on such an axle. In some other implementations, the wheel casters 132 may include two or more axles. Alternatively, in still other implementations, a single caster may be provided in lieu of the multiple wheel casters 132 shown in FIG. 1. In accordance with the present disclosure, the wheel casters 132 may operate in any manner, such as being configured to pivot or swivel, and thus automatically adjust or align with a direction of travel. In some examples, the cart 104 may be equipped with other apparatuses for enabling the cart 104 to travel on solid surfaces, including one or more wheeled components other than casters, including but not limited to omnidirectional wheels, spherical wheels or other like apparatuses. Additionally, in some other implementations, the cart 104 may include two or more skis or other runners for traveling on smooth surfaces. In still other implementations, the cart 104 may be levitated, e.g., by magnetic levitation through the use of one or more linear induction motors. Moreover, the cart 104 may be propelled or pushed by humans or autonomous mobile robots or, alternatively, by one or more motors (e.g., electric-powered or gasoline-powered).

As illustrated, the cart 104 may include one or more capture assemblies 134 that include components for use in identifying items placed in the basket 126, and removed from the basket 126. The capture assemblies 134 may be positioned at any location on the cart 104 (e.g., in the basket 126, on the basket 126, mounted to the frame 124, mounted to the basket 126, and/or any other location). In some examples, the cart 104 may include at least four capture assemblies 134(1), 134(2), 134(3), and 134(4) that are disposed or coupled proximate to four corners of the top of the basket 126. In some examples, one or all of the components of the capture assemblies 134 may be disposed internal to the form factor of the basket 126 and/or frame 124, at least partially internal to the form factor of the basket 126 and/or frame 124, and/or entirely external to the form factor of the basket 126 and/or frame 124 (e.g., mounted to the cart 104). However, in the illustrated example, the capture assemblies 134 may be disposed at locations proximate to the four corners of the top or perimeter of the basket 126/frame 124. In some instances, the less that the capture assemblies 134 protrude from the form factor of the cart 104, the more efficiently the carts 104 may be nested with respect to each other.

Generally, the capture assemblies 134 may each include at least one camera, one light source (e.g., LED), and one proximity sensor (e.g., ToF sensor, PIR sensor, etc.). For instance, each of the capture assemblies 134 may include a printed circuit board to which each of the camera, LED, and proximity sensor are coupled. The capture assemblies 134 may be coupled to the frame 124/basket 126 proximate to each of the four corners, and oriented according to view items 106 being placed in the basket 126. The capture assemblies 134 may each comprise or have optical axis oriented to view items 106 being placed in the basket 106. Generally, an optical axis of the capture assemblies 134, or at least the cameras, may be an imaginary line along which there is some degree or rotational symmetry in an optical system, such as the camera of the capture assemblies 134. The optical axis may define the path along which light propagates through the camera of the capture assemblies 134. Thus, the capture assemblies 134 may each have respective optical axis that are directed upward from the horizontal plane along which the top of the basket 126 is disposed, and inward or towards an interior of the perimeter of the top of the basket 126. The orientation of the capture assemblies 134 is further described with reference to at least FIGS. 2A, 2B, and 3.

In some examples the proximity sensors in the capture assemblies 134 may be activated to detect the proximity of items 106 or other objects above the top of the basket 126. The proximity sensors may be configured to generate sensor data that indicates distances between objects above the top of the basket 126 of the cart 104 and the capture assemblies 134. The cart 104 may include components configured to analyze the sensor data and determine that an item 106 is within some threshold distance from the top of the basket 126, and/or within the basket 126. Upon detecting an object within the threshold proximity to the capture assemblies 134 using the proximity sensor, one or more components of the cart 104 may cause the light sources (LEDs) of the capture assemblies 134 to emit light, and also cause the cameras of the capture assemblies 134 to generate image data. In some examples, the FOVs of the cameras may each at least partially overlap at a location above the top of the basket 126 corresponding to a centroid of the quadrilateral defining the top of the basket 126. The light sources may illuminate the basket 126 and/or the area above the top of the basket 126 to illuminate items 106 being placed in the cart 104, or removed from the cart 104, to act as a "flash" for the cameras that are generating image data. The cameras of the capture assemblies 134 may generate image data for a predefined period of time, and/or until the proximity sensors (or the image data itself) indicates that there is no longer an object within the threshold distance from the cart 104 or top of the cart 104.

After generating the image data, one or more components of the cart 104 may process the image data to determine an item identifier for the item(s) 106 represented in the image data, and an event 110 for the image data (e.g., addition of an item 106 to the cart, removal of an item 106 from the cart). As described in more detail below with respect to FIG. 5, the cart 104 may include component(s) to determine an item 106 identifier for the item 106 (e.g., name of the item 106, SKU number for the item 106, etc.), and determine if the item 106 is being taken from the cart 104, or added to the cart 104, based on the motion of the item 106 and the result of the movement around the cart 104 once movement is no longer detected and represented by the image data. The components of the cart 104 may then update a virtual shopping cart associated with the cart 104 that indicates a virtual listing of items 106 taken by the user 108 from the facility based on the determined event 110. In some examples, the image data may be transmitted to the server(s) 120 over the network(s) 122 where the processing may be performed.

In various examples, the cart 104 may include a display 136 to present various information in user interface(s) for the user 108 to consume. In some examples, the display 136 may comprise a touch screen to receive input from the user 108 (e.g., a selection of an item identifier to disambiguate amongst potential item identifiers). The cart 104 may further include a battery pack module 138 that houses one or more batteries to power the components of the cart 104. The battery pack module 138 may include rechargeable batteries. In some examples, the battery pack module 138 may be detachably coupled to the wheel frame 130 and/or the frame 124 of the cart 104 such that the battery pack module 138 may be removed and taken to a charging station. In various examples, the battery pack module 138 may include rechargeable batteries that may be charged when the cart 104 is placed in a cart corral 116 (e.g., through electrical contacts, power cords, etc.). In various examples, the frame 124 and/or basket 126 may have one or more channels (e.g., grooves, holes, paths, tunnels, etc.) through which power cables/cords may pass. In this way, power cables may be run at least partially through the channels in the frame 124 and/or basket 126 inconspicuously to provide power to the various components of the cart 104.

Figure 2A:
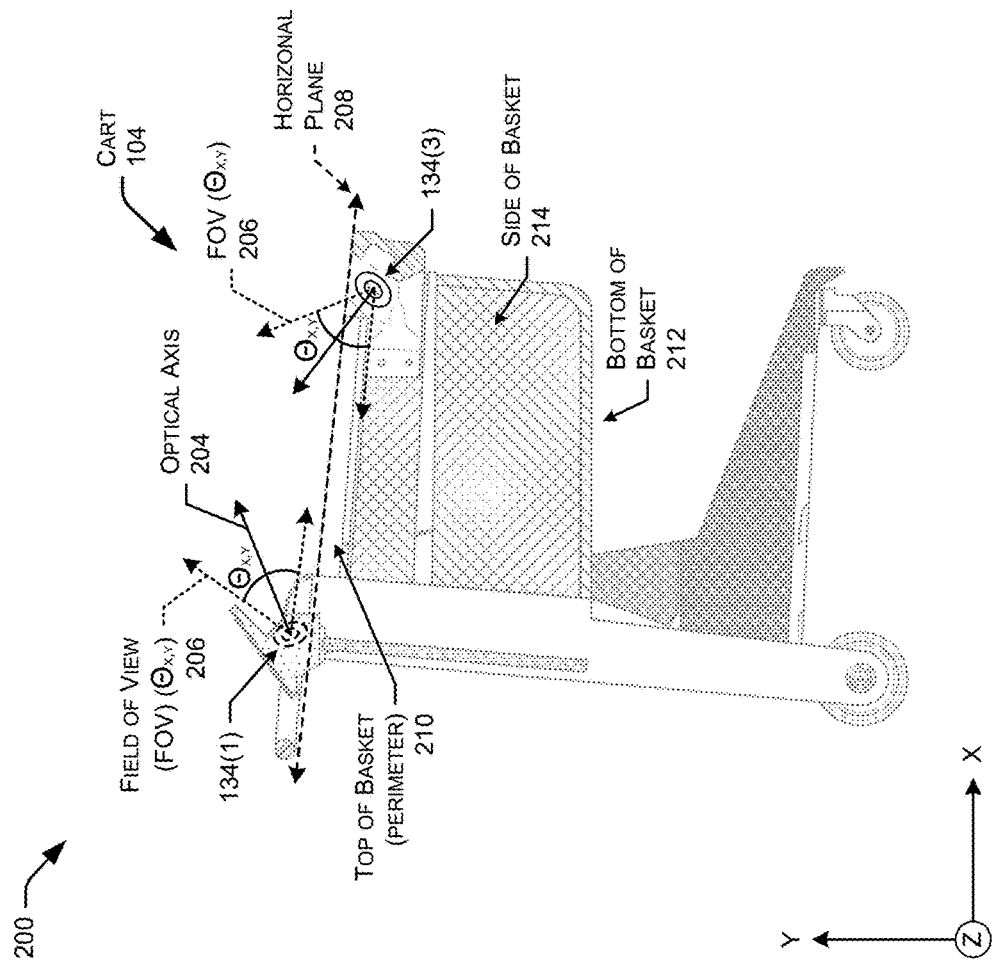

FIG. 2A illustrates an example cross-sectional view 200 of an item-identifying cart 104 that has capture assemblies 134 for identifying items 106 placed in the cart 104. As illustrated, the cross-section of the cart 104 shown in the view 200 of the cart 104 is taken along a plane defined by the x-axis and y-axis along the center of the cart 104 from the back to the front of the cart 104.

In some examples, a first capture assembly 134(1) is positioned at a first corner of the basket 126 near the back of the cart 104. The first capture assembly 134(1) may have an optical axis 204 and a FOV 206 oriented along the x-y plane. The optical axis 204 of the first capture assembly 134(1) may be directed upward from a substantially horizontal plane 208 and towards the interior of the perimeter 210 of the basket 126. In some examples, the basket 126 may include a bottom of the basket 212, ones or more sides of the basket 214 protruding up from the bottom 212, and a top of the basket (perimeter) 210 that is disposed along the substantially horizontal plane 208. In some examples, the FOV 206 of each of the capture assemblies may have a lower edge that is defined according to the horizontal plane 208.

The first capture assembly 134(1) may have an optical axis 204 directed upward from the substantially horizontal plane 208 and towards the interior of the perimeter 210 of the basket 126. In some examples, the FOV ($\theta_{x,y}$) 206 may be defined according to the optical axis 204 (e.g., the optical axis 204 may be approximately the middle of the FOV 206). The FOV 206 may be any FOV for cameras in the first capture assembly 134(1) (e.g., 80 degrees, 70 degrees, 45 degrees, etc.). Generally, the FOV 206 may at least partially include an area above the top of the basket 210. Similarly, a second capture assembly 134(3) coupled proximate to a corner of the basket 126 on the front of the cart 104. The second capture assembly 134(3) may have an optical axis 204 directed upward from the substantially horizontal plane 208 and towards the interior of the perimeter 210 of the basket 126. The first and second capture assemblies 134 may be positioned above the top of the basket 210, below the top of the basket 210, or at least partially along the top of the basket 210.

In some examples, the FOVs 206 may include an area above the top 210 of the cart 104, an area within the basket 126 of the cart, and/or a combination of above and below the top 210 of the basket 126.

FIG. 2B illustrates an example top view 216 of an item-identifying cart 104 that has capture assemblies 134 for identifying items 106 placed in the cart 104. As illustrated, the cart 104 is shown from a top such that the dimensions of the cart 104 are illustrated along an x-axis and a z-axis (x-z coordinate plane).

In some examples, four capture assemblies 134 are positioned at four different corners of the frame 124 and/or basket 126 of the cart 104. Each of the four capture assemblies 134 may include respective optical axes 218 directed inward relative to the perimeter 210 of the basket 126. Additionally, the four capture assemblies 134 may each have FOVs ($\theta_{x,z}$) 220 that are defined according to the optical axes 218 (e.g., the optical axes 218 may be approximately the middle of the FOVs 220). The FOVs 220 may be any FOV for cameras in the capture assemblies 134 (e.g., 80 degrees, 70 degrees, 45 degrees, etc.). Generally, the FOVs 220 for each of the capture assemblies 134 may overlap at least partially at a centroid 222 of the frame 124 and/or basket 126 of the cart 104. The FOVs 220 may, in combination, cover all, or most, of the interior of the perimeter 210 of the basket 126 such that items 106 are detected and identified using at least one of the capture assemblies 134.

Figure 2D:
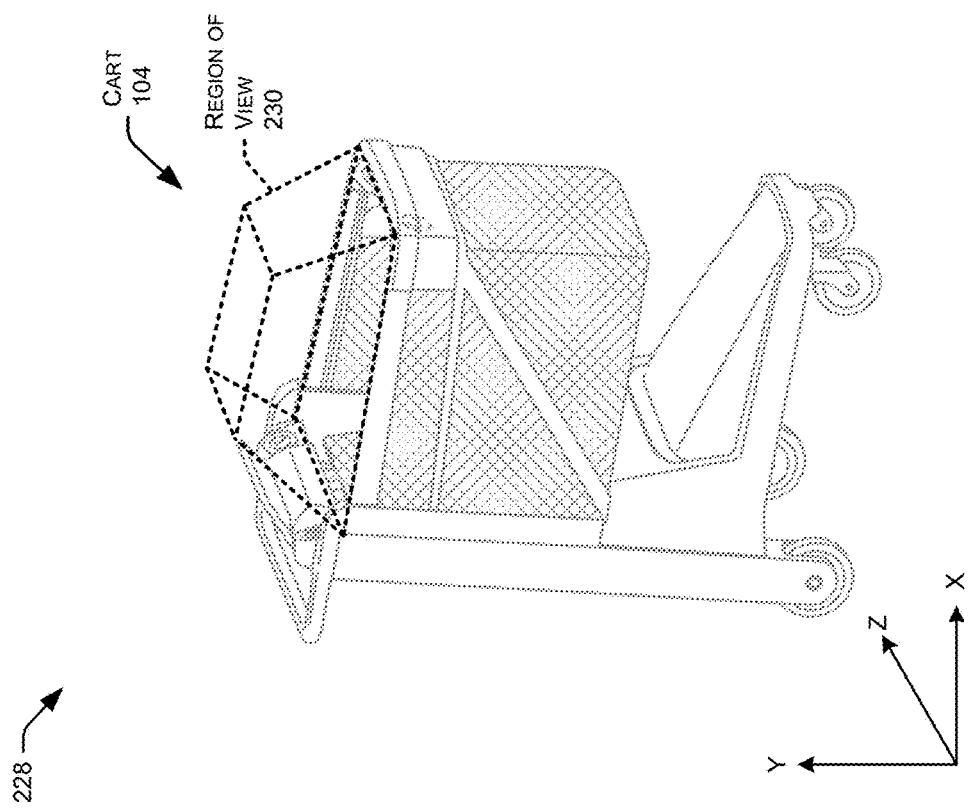
Figure 2C:
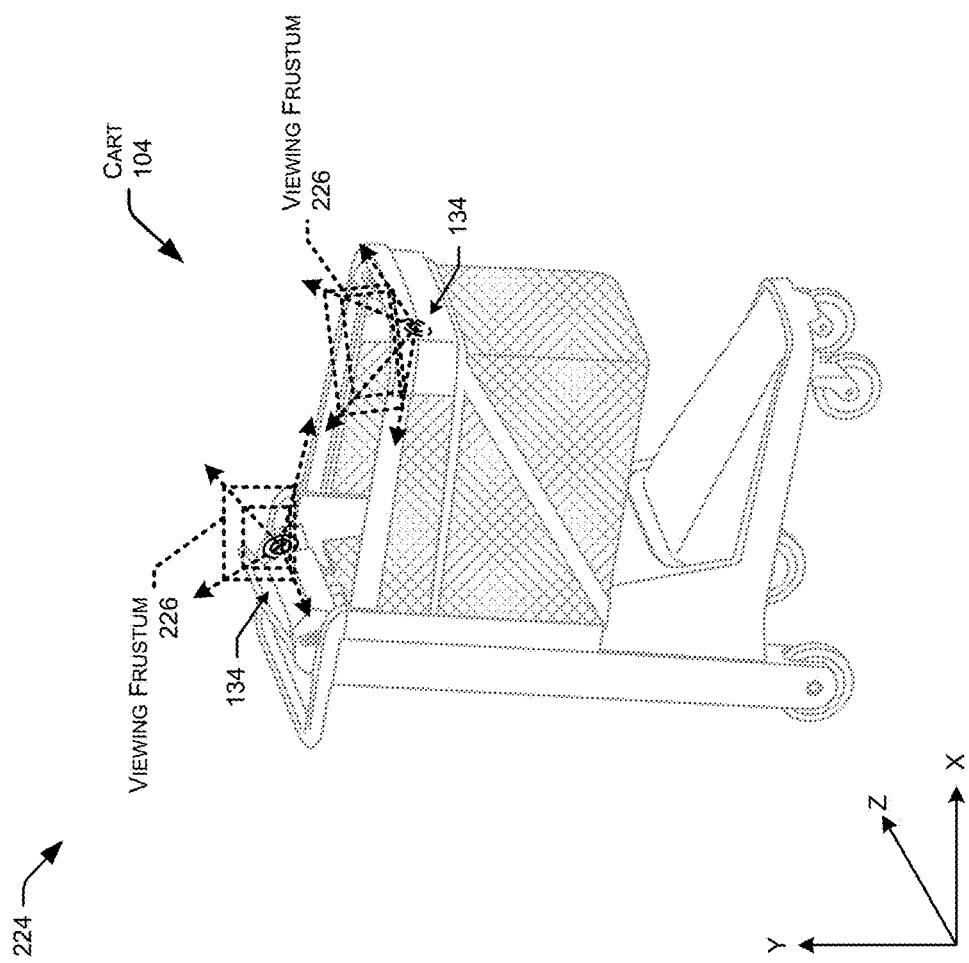

FIG. 2C illustrates an example perspective view 224 of an item-identifying cart 104 that has camera assemblies 134 for identifying items 106 placed into the cart 104.

As illustrated, the cart 104 may include multiple capture assemblies that have viewing frustums 226 that may be oriented in the same direction as the optical axis 204. The viewing frustums 226 may generally be the region of space in the environment of the cart 104 that is within the field of view of the camera and/or proximity sensor of the capture assemblies 134. The viewing frustums 226 for each of the camera assembles 134 may be oriented inward to the basket 126 of the cart, and upward relative to the top, or perimeter, of the basket 210. The proximity sensor and camera in the capture assembles 134 may have the same viewing frustum 226, or different viewing frustum's 226 that at least partially overlap.

FIG. 2D illustrates another example perspective view 228 of an item-identifying cart 104 that has camera assemblies 134 for identifying items 106 placed into the cart 104.

As shown in FIG. 2D, the viewing frustums 226 and/or FOV's 206 for each of the capture assemblies 134 may generally define a region of view 230. The region of view 230 may comprise a volumetric, three-dimensional (3D) shape in which items 106 are captured in image data of the cameras, and/or detected by proximity sensors. Thus, the region of view 230 defines a volumetric region in which at least one of the cameras in a capture assembly is able to capture image data representing an item 106. Generally, the region of view 230 may encompass substantially all, or a large majority of, the perimeter of the top of the basket 210. In this way, items 106 placed in the basket 126 will be detected and have image data generated that represents the items 106 as they are being placed in the basket 126. Although illustrated as including space above the basket 126, in some examples, the region of view 230 may additionally, or alternatively, include space inside the basket 126 (e.g., downward facing cameras). In some instances, the region of view 230 defined by the cameras on the cart 104 may be the same as the region of view 230 of the proximity sensors, or different than the region of view 230 of the proximity sensors.

Figure 3:
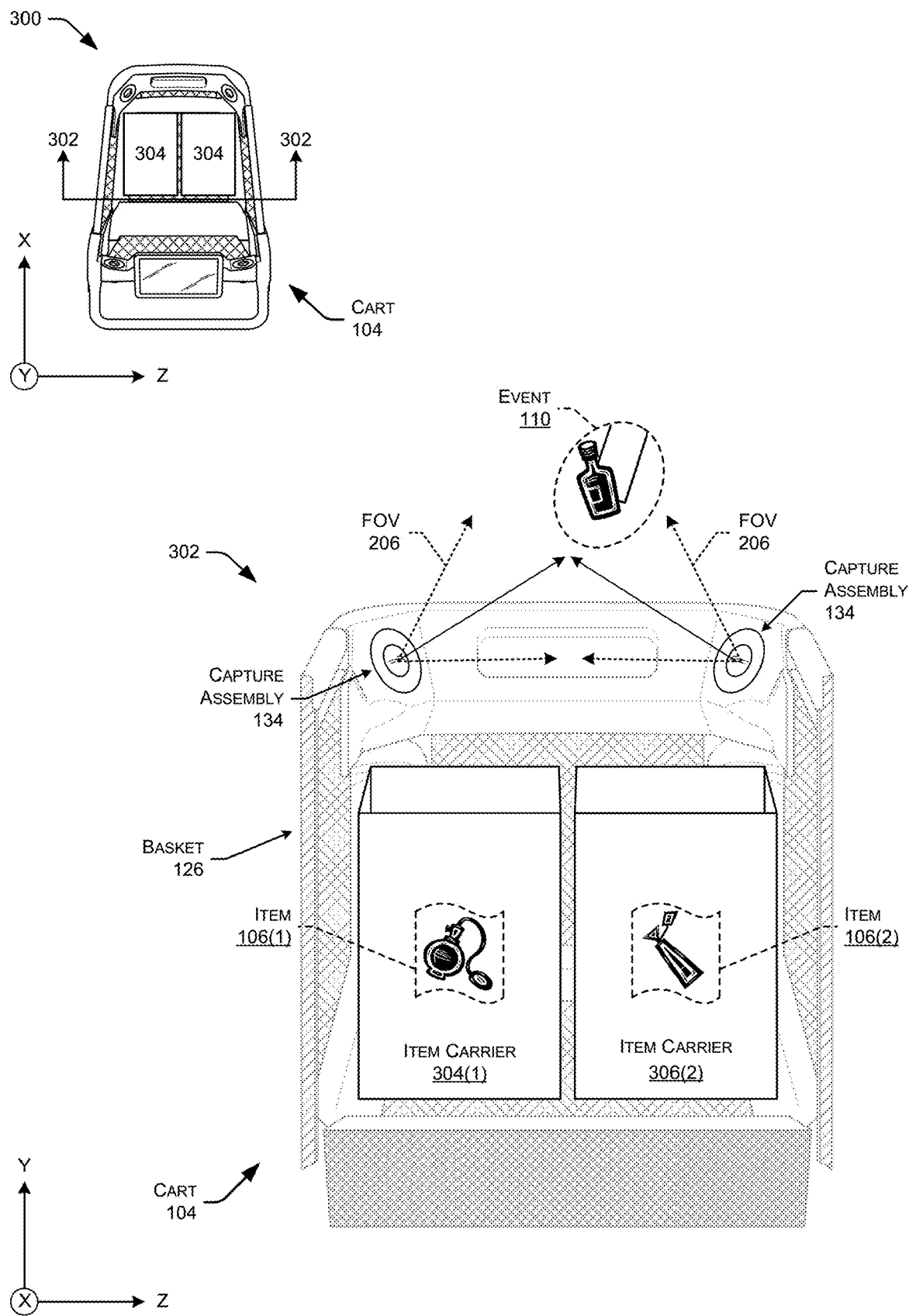
FIG. 3 illustrates another example cross-sectional view of an item-identifying cart that has item carriers placed inside the basket of the cart, and capture assemblies that are used to identify an item being placed in the item carriers.

FIG. 3 illustrates another example of an item-identifying cart 104, including a top view 300 and a cross sectional view 302, that has item carriers 304 placed inside the basket of the cart 102, and capture assemblies 134 that are used to identify an item being placed in the item carriers 304.

As illustrated by the top view 300, the cart 104 may include a basket that is sized to store one or more item carriers 304, such as bags (e.g., plastic bags, paper bags, etc.), boxes, user-provided item carrier, and/or any other item carrier 304. In some examples, the cart 104 may have a basket 126 that is sized to efficiently fit (e.g., minimize empty space in the basket 126) one or more of the item carriers 304. As shown in the cross-sectional view 302 of the basket 126 of the cart, the item carriers 304 may be sized such that the tops of the item carriers 304(1) and 304(2) are below the perimeter defining the top of the basket 126. In this way, the FOVs of the capture assemblies 134 are not obstructed by the item carriers 304.

As shown, the item carriers 304 may have items 106 stored therein, which are no longer visible to cameras due to their placement in the item carriers 304. Accordingly, if the capture assemblies 134 had FOVs 206 that generated image data of the interior of the basket 126, the items 106 may not be visible due to occlusion from the item carriers 304. However, to identify the items 106 placed in a cart 104, the capture assemblies 134 need to be able to view the items 106, which would prevent users 108 from being able to place item carriers 304 in their carts 104. Thus, by having FOVs 206 that at least partly face upward relative to the top of the perimeter of the basket 126, the items 106 that are placed in the basket are identifiable in image data generated by the capture assemblies 134. Additionally, users 108 are able to place their item carriers 304 directly in the basket 126 to receive items 106 as the user 108 shops, thereby reducing friction in the traditional-checkout experience by having to take items out of the cart 104 to be bagged or otherwise placed in item carriers 304.

In some examples, the basket 126 (or other location on the cart 104) may include one or more hooks to help support the item carriers 304. For instance, the item carriers 304 may be a cloth, or other material, with handles or holes. To help hold the item carriers 304 open and/or up, the basket 126 may include hooks near the top or perimeter and/or hooks on the outside of the basket 126 to hook into holes of the item carriers 304 and/or to hold up handles of the item carriers 304.

Figure 4:
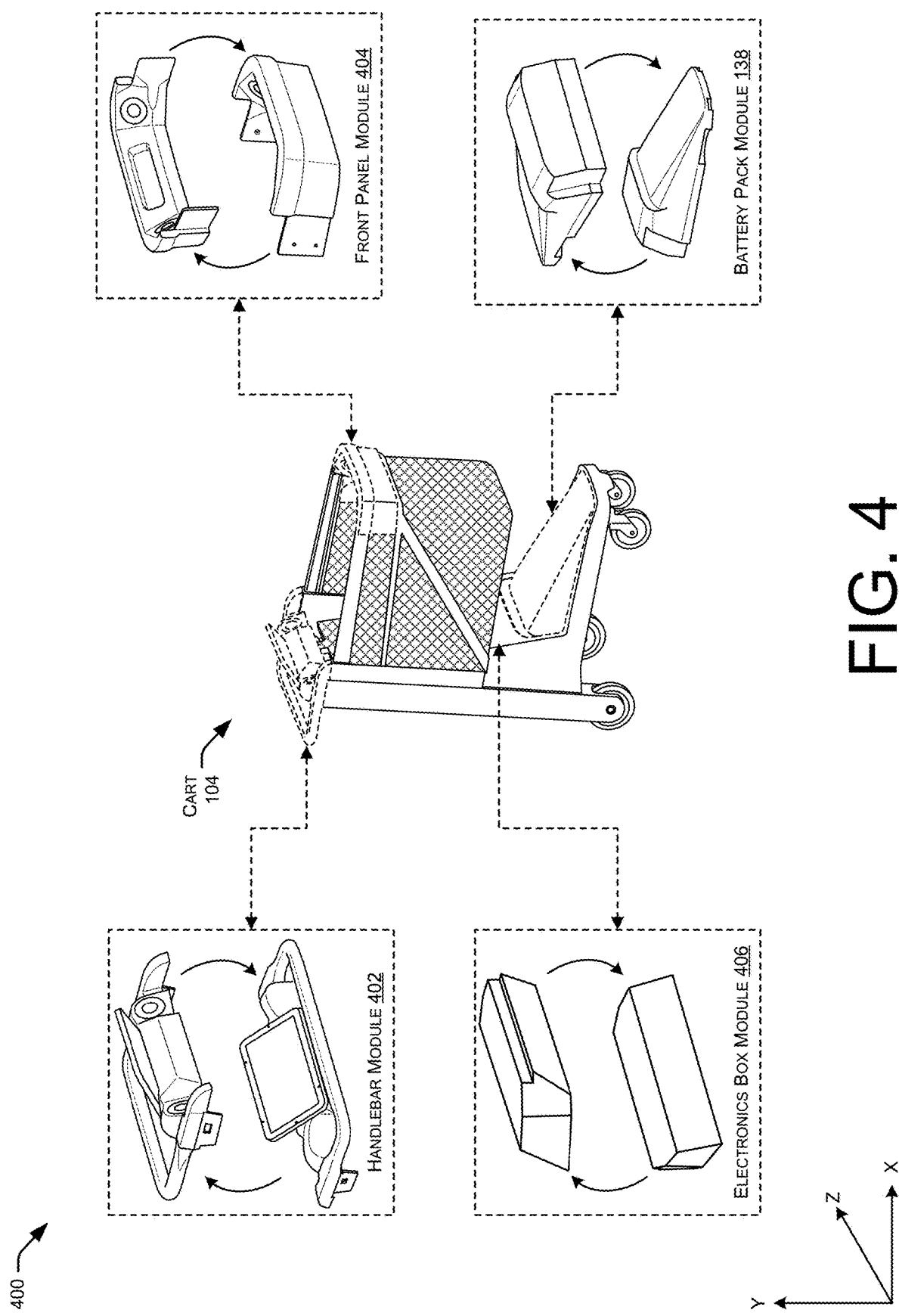
FIG. 4 illustrates perspective views of example perspective hardware components of an item-identifying cart.

FIG. 4 illustrates perspective views of example perspective hardware components of an item-identifying cart. The illustrated components are merely examples of how the hardware and/or software components of the cart 104 may be arranged and designed, but other embodiments or examples are equally usable to implement the techniques described herein by the cart 104.

As shown, a handlebar module 402 may be positioned proximate the back of the cart 104 and may include at least two capture assemblies 134, the display 136, and the handle 128. In some examples, the handlebar module 402 may further include one or more microphones and one or more loudspeakers to facilitate dialogues with a user 108, and/or provide other auditory feedback and notifications. Although illustrated as having capture assemblies 136 above the top of the basket, in some examples, the capture assemblies may be positioned below the top of the basket. Additionally, in some examples the capture assemblies 136 may be oriented such that their viewing frustum is facing downward into the basket.

The cart 104 may also include a front panel module 404 that includes two or more capture assemblies 136 as illustrated. In some examples, the front panel module 404 may be mounted to the basket 126 of the cart 104 and have an integrated handle for pulling the front panel module 404 off the cart 104. The front panel module 404 may be positioned such that the included capture assemblies 134 are not occluded by other components of the cart 104.

The cart 104 also includes an electronics box module 406 that may include various electronic components, such as hardware and/or software components, of the cart 104. The electronics box module 406 may be coupled to the frame 124 and/or basket 126 in the illustrated location to help protect components from damage. In some examples, the electronics box module 406 may include hardware processor(s) for the cart 104, memory, software components, and/or other control circuitry for the cart 104. The electronics box module 406 may receive power from the batter pack module 138, and control how the power is distributed to the other components or modules of the cart 104 (e.g., using I2C connections). Components of the electronics box module 406 are described further with respect to FIG. 5.

Further, the cart 104 may include the battery pack module 138 which may include one or more batteries that power the technology (e.g., sensors, processing system, etc.) on the cart 104. The battery pack module 138 may include provisions for one or more batters, relevant electronics (e.g. interface, power distribution/management, etc.), an LED status indicator (e.g., illustrating battery/system health), and a wire harness that connects to the electronics box module 406. The battery pack module 138 may include the power distribution board that will regulate power from the battery(ies) provided to the electronics box module 406. In some examples, the cart 104 may also include one or more internal batteries and/or capacitors to "hot swap" the battery pack module 138 (e.g., temporarily power components of the cart 104 while battery pack modules 138 are swapped out on the cart 104 to replace a dead battery pack module 138 with a charged battery pack module 138).

Figure 5:
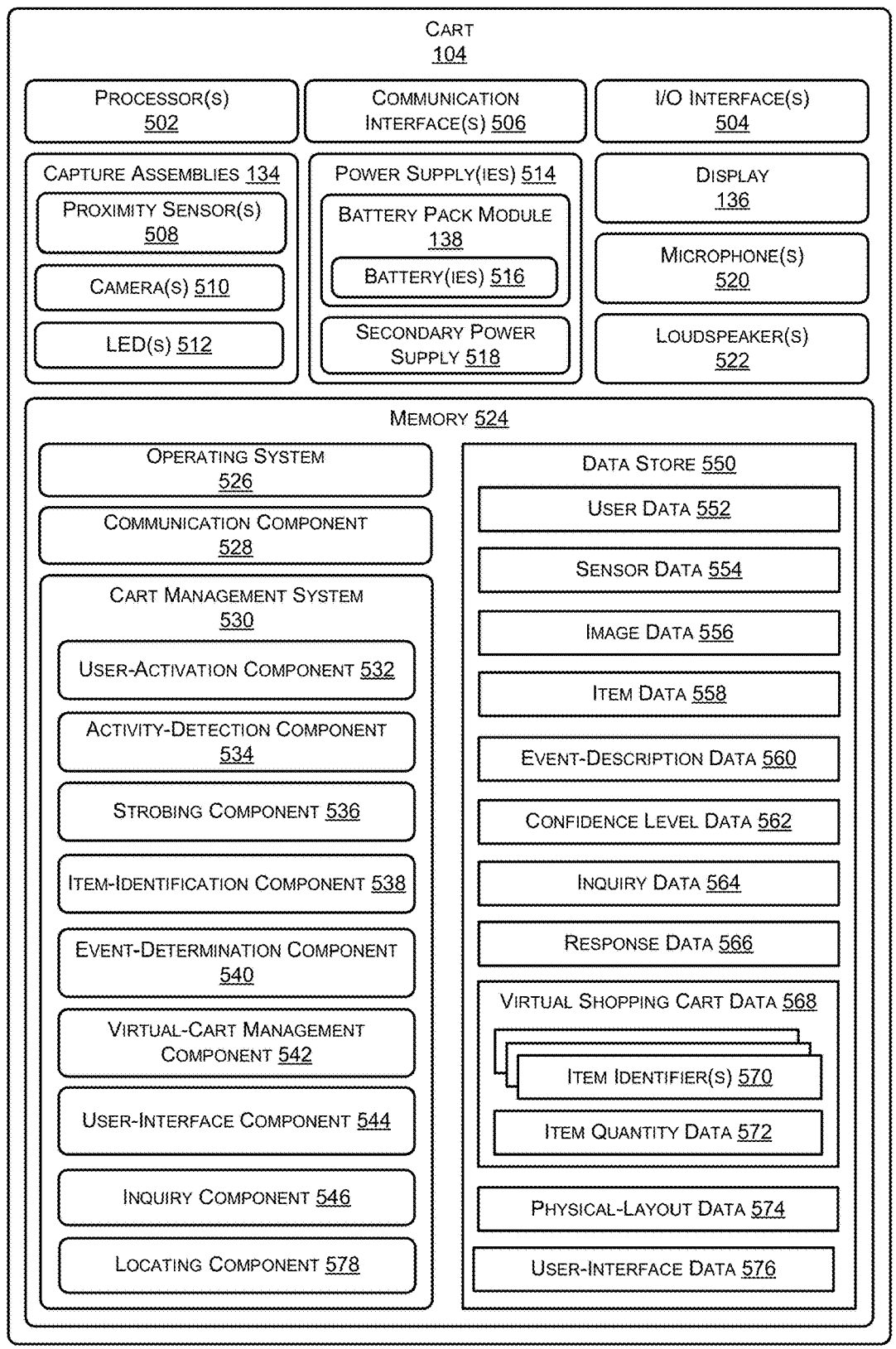
FIG. 5 illustrates example components of an item-identifying cart configured to support at least a portion of the functionality of a cart management system.

FIG. 5 illustrates example components of an item-identifying cart 104 configured to support at least a portion of the functionality of a cart management system.

The cart 104 may include one or more hardware processors 502 (processors) configured to execute one or more stored instructions. The processors 502 may comprise one or more cores. The cart 104 may include one or more input/output (I/O) interface(s) 504 to allow the processor 502 or other portions of the cart 104 to communicate with other devices. The I/O interfaces 504 may comprise Inter-Integrated Circuit (I2C), Serial Peripheral Interface bus (SPI), Universal Serial Bus (USB) as promulgated by the USB Implementers Forum, and so forth. The I/O interfaces 504 may allow the various modules/components (e.g., handlebar module 402, front panel module 404, electronics box module 406, battery pack module 138, etc.) to communicate with each other and/or control each other.

The cart 104 may also include one or more communication interfaces 506. The communication interfaces 506 are configured to provide communications between the cart 104 and other devices, such as the server(s) 120, sensors, interface devices, routers, and so forth. The communication interfaces 506 may include devices configured to couple to personal area networks (PANs), wired and wireless local area networks (LANs), wired and wireless wide area networks (WANs), and so forth. For example, the communication interfaces 506 may include devices compatible with Ethernet, Wi-Fi™, and so forth. The cart 104 may also include one or more busses or other internal communications hardware or software that allow for the transfer of data between the various modules and components of the cart 104.

The cart 104 may also include the one or more capture assemblies 134 that each include one or more proximity sensors 508, a camera (or other imaging device), and one or more LEDs 512. The proximity sensor(s) 508 may comprise any type of sensor that is able to detect the presence of nearby objects without the need for physical contact (e.g., ToF sensors, PIR sensors, etc.). The cameras 510 in each of the capture assemblies 134 may comprise any type of camera or imaging device configured to generate image data (and/or video data), or information descriptive of a plurality of picture elements or pixels. The LED(s) 512 may be selectively activated to emit light at any wavelength, visible or non-visible to users 108.

In some examples, one or more capture assemblies 134 may additionally, or alternatively, be facing downward into the basket 126 of the cart 104. Additionally, the cart 104 may include one or more cameras 510 that are outward facing in that generate image data representing the facility 102 around the cart 104.

The cart 104 may include one or more power supply(ies) 514 to provide power to the components of the cart 104, such as the battery pack module 138. The power supply(ies) 514 may also include a secondary (e.g., internal) power supply 518 to allow for hot swapping of battery pack modules 138, such as one or more capacitors, internal batteries, etc.

The cart 104 may also include a display 136 configured to display image data, such as pictures, videos, user interface elements, and/or any other image data. The display 136 may comprise any type of display 136, and may further be a touch screen to receive touch input 108 from a user. The cart 104 may also include one or more microphones 520 and one or more loudspeakers 522 to facilitate a dialogue with a user 108, and/or to receive feedback from the user 108. The microphone(s) 520 may capture sound representing the user's speech, and the loudspeaker(s) 522 may output machine-generated words to facilitate a dialogue, prompt a user 108 for feedback on an item 106 and/or for other information, and/or output other alerts or notifications.

The cart 104 may include one or more memories 524 (e.g., in the electronics box module 406 along with the processor(s) 502). The memory 524 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 524 provides storage of computer-readable instructions, data structures, program modules, and other data for the operation of the cart 104. A few example functional modules are shown stored in the memory 524, although the same functionality may alternatively be implemented in hardware, firmware, or as a system on a chip (SOC).

The memory 524 may include at least one operating system (OS) component 526. The OS component 526 is configured to manage hardware resource devices such as the I/O interfaces 504, the communication interfaces 506, and provide various services to applications or components executing on the processors 502. The OS component 526 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 524. These components may be executed as foreground applications, background tasks, daemons, and so forth. A communication component 528 may be configured to establish communications with one or more of the sensors, one or more of the servers 120, or other devices. The communications may be authenticated, encrypted, and so forth.

The memory 524 may further store a cart management system 530. The cart management system 530 is configured to provide the item-identifying functions (and other functions) provided by the cart 104 as described herein. For example, the cart management system 530 may be detect items 106, identify items 106, and maintain a virtual shopping cart for a user 108 of the cart 108.

The cart management system 530 may include a user-activation component 532 that performs operations for activating a shopping session using a cart 104 on behalf of a user 108. For instance, a user 108 may have previously registered for a user account with an operator of the facility to utilize various automated management services provided by an operator of the facility 102. The user 108 may have registered for a user account, such as by providing user data 552, to automate payments made for items taken by the user and included a payment means (e.g., credit card, bank account number, etc.), and may have also provided an identification means in the user data 552 to the user-activation component 532 such that the cart 104 can recognize the user 108. For instance, the user 108 may have registered to identify themselves to the cart 104 using any identification technique by the user-activation component 532, such as by providing user data 552 by presenting an identification means to a camera/scanner 510 (e.g., presenting a driver's license, presenting a facility-issued card, presenting a user identifier via a mobile phone, etc.), speaking a predefined utterance that is captured by the microphone(s) 520 (e.g., a name of the user, a predefined keyword, etc.), and/or looking into a camera 520 for facial recognition. Once a user 108 has identified themselves to using the user-activation component 532, the user-activation component 532 may open a shopping session where the cart 104 identifies and track items 106 retrieved by the user 108 and placed in the cart 104.

The cart management system 530 may additionally include an activity-detection component 534 configured to detect items 106 (or objects) within a particular proximity to the cart. For example, one or more proximity sensor(s) 508 may generate sensor data 554 that indicates a distance between the proximity sensor(s) 508 and any objects located in the FOV of the proximity sensor(s) 508. The activity-detection component 534 may analyze the sensor data 554 and determine if an object is within a threshold distance indicating that the object is near the cart 104 and/or within or near the perimeter of the top of the basket 126 of the cart 104 (e.g., one foot from the proximity sensor(s) 508, two feet from the proximity sensor(s) 508, etc.). In this way, the proximity sensor(s) 508 may generate sensor data 554 that indicates whether or not an item 106 is being moved in or out of the basket 126 of the cart 104. However, in some examples, rather than using sensor data 554 generated by a proximity sensor(s) 508, the activity detection component 534 may utilize image data 556 generated by the camera(s) 510 to determine if an object is within a threshold distance from the cart 104.

The cart management system 530 may further include a strobing component 536 configured to cause the LED(s) 512 and/or shutters of the camera(s) 510 to strobe according to different frequencies. As noted above, the LED(s) 512 may emit light in any light spectrum (e.g., infrared, near infrared, visible, etc.). However, some items 106 may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the LED(s) 512 to emit light in the visible spectrum. When generating image data 556 using camera(s) 510, motion blur may appear when capturing fact moving objects. However, the motion blur may be reduced or eliminated by exposing the camera(s) 510 imager for a short (e.g., sub-millisecond) durations. Accordingly, the strobing component 536 may strobe the opening and closing of shutters of the camera(s) 510 to limit the sensor exposure duration. Additionally, the strobing component 538 may cause the LEDs to emit/strobe light at a particular frequency, as discussed further with respect to FIG. 6.

The cart management system 530 may also include an item-identification component 538 configured to analyze image data 556 to identify an item 106 represented in the image data 556. The image data 556 may comprise information descriptive of a plurality of picture elements, or pixels, for one or more image frames (e.g., a still picture, multiple picture frames, video frames, etc.). The item-identification component 538 may analyze the image data 556 using various image processing techniques, or computer vision techniques. For instance, the item-identification component 538 may extract a representation of an item 106 depicted in the image data 556 generated by at least one camera(s) 510. The representation may include identifying text printed on the item 106, colors or color schemes printed in the item, determining 2-D and/or 3D shapes of the items 106, and/or other techniques for extract a representation of the item 106. In some instances, the representation of the item 106 depicted in the image data 556 may comprise a numeric representation, such as a feature vector or a set of feature vectors.

In some examples, a data store 550 stored in the memory 524 may include item data 558, which may include representations of the items 106 offered for acquisition at the facility 102. The item-identification component 538 may compare the extracted represented of the item 106 with the "gallery" or stored representations of the known items 106 in the item data 558. In some instance, the item representation may include an indication of a barcode or SKU data for the item 106 as recognized in, or extracted from, the image data 556. The item-identification component 538 may determine confidence level data 562 based on the comparisons with item representation in the item data 558. The item-identification component 538 may determine, and assign, confidence levels indicating how likely it is that the item 106 represented in the image data 556 corresponds to an item from the item gallery in the item data 558. Based on the confidence level data 562, the item-identification component 538 may determine an item identifier 570 for the item in the image data 556 (or multiple item identifiers 570) that corresponds to an item in the item data 558 to which the item 106 corresponds.

In some examples, the data store 550 may include physical-layout data 574 that is used by the item-identification component 538 to determine the item 106. The physical-layout data 574 may include or provide a mapping of physical locations within the physical layout of devices and objects such that the location of the cart 104 may be utilized to determine an item 106 stored nearby. The physical-layout data 574 may indicate the coordinates within the facility 102 of an inventory location 112, items 106 stored at that inventory location 112, and so forth. In examples where the cart 104 has location determining sensors (e.g., GPS, RFID, proximity, etc.), the location sensor data may be used to determine where in the store the user 108 is. In such examples, the item-identification component 538 may access the physical-layout data 574 to determine if a location associated with the event is associated with items 106, and confidence levels for the corresponding representations of items in the item data 558. Continuing the example above, given the location within the facility 102 of the event and image camera data, the physical-layout data 574 may determine the items 106 that may have been represented in generated images of the event 110.

The cart management system 530 may further include an event-determination component 540 to determine event-description data 560 for the item 106 in the image data 556. The event-determination component 540 may determine if the user 108 is adding an item 106 to the cart 104, removing the item from the cart 104, etc., based on movement of the item 106 and/or whether the item is shown in the image data 556. For instance, if the item 106 is shown as being moved downward towards the interior of the cart 104, and the user's hand 108 then leaves the basket without the item, 106 it can be determined that the user 108 added the item 106 to the cart 104. Similarly, if the user's hand 108 moves into the cart without an item 106, and is depicted in the image data 556 taking an item 106 from the cart, the event-determination component 540 may determine that the user 108 removed an item 106 from the cart 104.

The cart management system 530 may also include a virtual-cart management component 542 configured to manage virtual shopping cart data 568 for the cart 104. For instance, the virtual-cart management component 542 may utilize the item data 558, event-description data 560, and confidence level data 562 to add item identifier(s) 570 to the virtual shopping cart data 568 for items 106 that were added to the cart 104, remove item identifier(s) 570 from the virtual shopping cart data 569 for items 106 that were removed from the cart 104, and track item quantity data 572 indicating quantities of particular items 106 in the cart 104.

The cart management system 530 may further include a user-interface component 544 configured to present user interfaces on the display 136 based on user-interface data 576. The user interfaces 576 may include one or more fields to present data, and/or receive touch input (or other input via a keyboard, mouse, etc.) from a user 108. For instance, if the item-identification component 538 is unable to determine an item identifier 570 for an item 106 shown in the image data 556, the user-interface component 544 may receive inquiry data 564 generated by an inquiry component 546 to prompt a user 108 for feedback to help identify the item 106, and/or other information (e.g., if multiple items were placed in the cart 104). The inquiry component 546 may be configured to generate inquiry data 564 based on the information needed to identify the item 106. For instance, the inquiry data 564 may include a prompt to request particular feedback from the user 108, such as to provide input (e.g., touch input, vocal/utterance input, etc.) to identify the item 106, input to indicate how many items 106 were added to the cart, input to indicate whether an item 106 was removed or added, etc. In some examples, the user-interface component 544 may present one or more images depicting items from the item data 558 that have the highest confidence levels as corresponding tot eh item 106 in the image data 556, but confidence levels that are not high enough to make a final decision as to the item 106. For instance, the user-interface component 544 may present pictures of two different items that have high confidence levels 562 and request that the user 108 select or indicate the appropriate item 106. Additionally, or alternatively, the user-interface component 544 may present user-interface data 576 that prompts the user for feedback regarding whether or not the item 106 was added to, or removed from the cart 104.

In some examples, the cart management system 530 may further include a locating component 578 configured to determine locations of the cart 104 in the facility 102. For instance, the locating component 578 may analyze sensor data 554 collected by sensors of the cart 104 to determine a location. In some examples, the communication interface(s) 506 may include network interfaces that configured the cart 104 to receive or detect wireless signals (e.g., WiFi signals, Bluetooth signals, etc.) and generate sensor data 554 indicative of the signals. The locating component 578 may analyze the sensor data 554 using various techniques to identify the location of the cart 104, such as WiFi triangulation, received signal strength indicators (RSSI), and/or other methods for analyzing wireless signals to determine a location of the cart 104. In some instances, the facility 102 may include various infrared (IR) or near-IR emitters at different locations that emit light according to frequencies, patterns, etc. that indicate the different locations in the facility 102. In such examples, the cart 104 may include a light sensor to generate the sensor data 554 representing the IR or NIR and determine the location of the cart 104 in the facility. In some instances, there may be visible landmarks or markers throughout the facility that indicate a location in the facility, and the locating component 578 may analyze image data 556 generated by an outward facing camera 510 to determine a location of the cart 104. As another example, there may be various radio frequency (RF) emitters positioned throughout the store, and the cart 104 may include an RF receiver to allow the locating component 578 to perform IR beaconing to determine the location of the cart 104. The locating component 578 may perform one, or any combination, of the above techniques to determine a location of the cart 104 in the facility and/or any other technique known in the art.

The locating component 578 may perform various operations based on determining the location of the cart 104 within the facility 102. For instance, the locating component 578 may cause user interface data 576 to be presented on the display 136 that includes a map of the facility 102 and/or directions to an item 106 for the user of the cart 104. Additionally, or alternatively, the locating component 578 may utilize the location of the cart, the physical-layout data 574, and/or item data 558 and "push" user interfaces to the display 136 that indicate various location-based information, such as indications of deals for items 106 located nearby, indications of items 106 located nearby and on the user's shopping list, and/or other user interface data 576.

Figure 6:
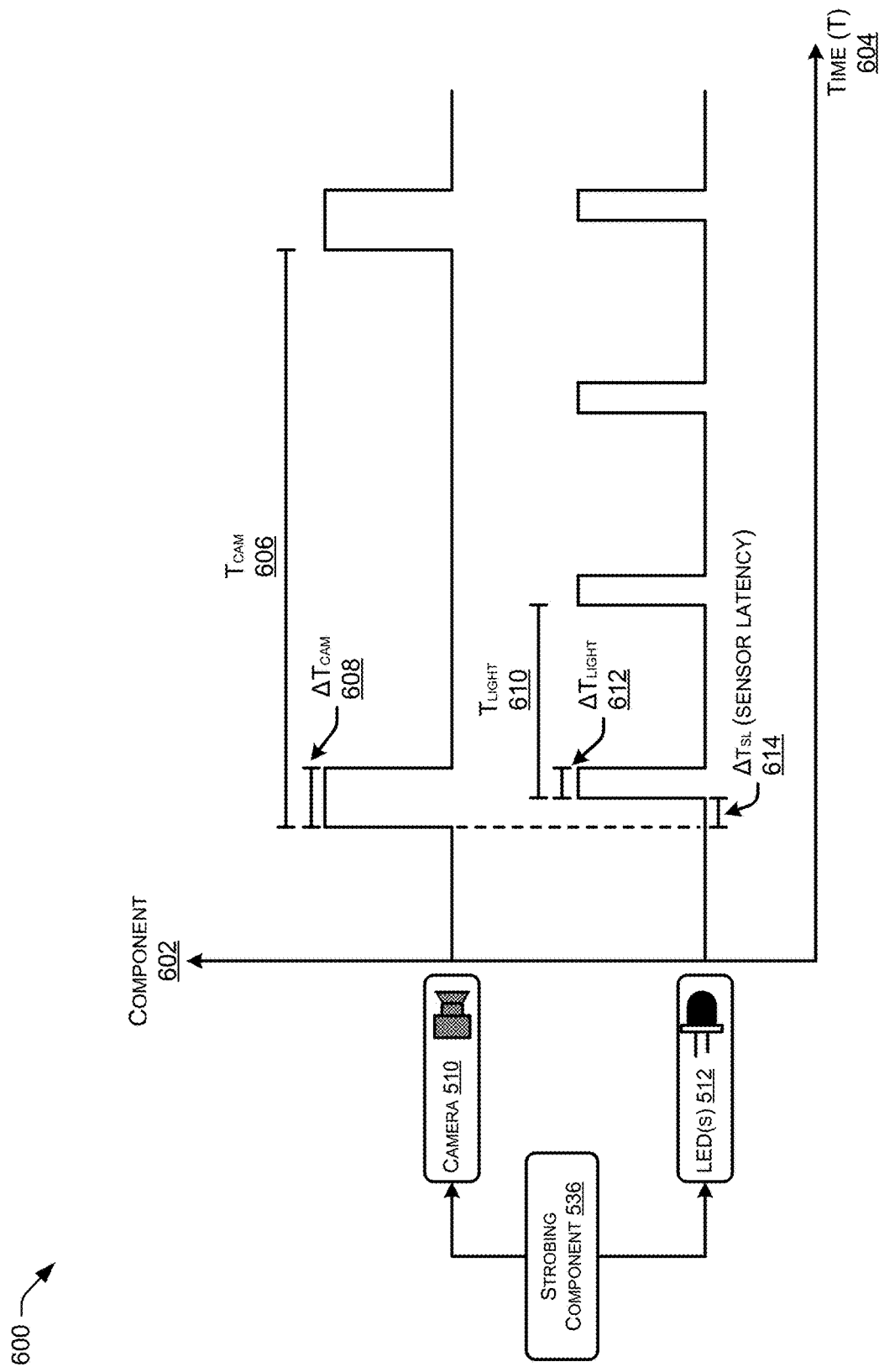
FIG. 6 illustrates an example timing diagram for strobing visible light from an LED and a camera shutter at respective strobe frequencies.

FIG. 6 illustrates an example timing diagram 600 for strobing an LED 512 and a camera 510 shutter at respective strobe frequencies. As illustrated, the strobing component 536 may cause the strobing of the camera 510 shutter and the LED 512 at different frequencies. As noted above, the LED(s) 512 may emit light in any light spectrum (e.g., infrared, near infrared, visible, etc.). However, some items 106 may have text and/or other marking printed thereon using dye-based color inks that have diminished and/or similar near infrared (NIR) absorbance. This may lead to compromised contrast between, and essentially "washing out" of, many distinct features in the visible spectrum when viewed in NIR. Accordingly, in some examples it may be advantageous to cause the LED(s) 512 to emit light in the visible spectrum. When generating image data 556 using camera(s) 510, motion blur may appear when capturing fast moving objects. However, the motion blur may be reduced or eliminated by exposing the camera(s) 510 imager for a short (e.g., sub-millisecond) durations. Accordingly, the strobing component 536 may strobe the opening and closing of shutters of the camera(s) 510 to limit the sensor exposure duration. Additionally, the strobing component 538 may cause the LEDs to emit/strobe light at a particular frequency.

As shown, the timing diagram illustrates the strobing frequency of components 602 (e.g., camera 510 and LED 512) over time (T) 604. Thus, the strobing component 526 causes the camera shutter 510 to open and close according to a frequency over time 604, and causes at least one LED 512 to activate and deactivate according to a particular frequency over time. As illustrated, the camera 510 may have a frequency or capture cycle exposure between respective openings (or "pulses") of $T_{CAM}$ 606, and is pulsed, or has its shutter open, for a $\Delta T_{CAM}$ 608. Generally, to help reduce blur, the exposure time $\Delta T_{CAM}$ 608 for the imager of the camera 510 may be relatively low to help reduce motion (e.g., 50 µs, 500 µs, 600 µs, etc.). additionally, to help reduce blur, the frequency at which the camera 510 is opened $T_{CAM}$ 606 may be larger than the frequency at which the LED(s) 512 is strobed $T_{LIGHT}$ 610 (e.g., larger by a factor of 3 as illustrated).

Similarly, the strobing component 536 may cause the LED(s) 512 to activate and deactivate according to a particular frequency. For instance, the LED(s) 512 may have a strobing cycle of $T_{LIGHT}$ 610 with a sensor latency from the initiation of $T_{CAM}$ 606 of $\Delta T_{SL}$ 614. Additionally, the LED(s) 512 may have an emit time, or pulse time, of $\Delta T_{LIGHT}$ 612.

In instances where the LED(s) 512 emit visible light, it may be advantageous to strobe the LED(s) 512 at frequencies at which humans do not perceive the strobing. For instance, when LED(s) 512 are strobed at lower frequencies that are perceptible to humans, the strobing of the light may induce seizures in some humans. Accordingly, to avoid seizure-inducing strobing of the LED(s) 512, the strobing component 536 may cause the LED(s) 512 to strobe visible light on and off at a high enough frequency to be imperceptible (e.g., greater than 90 Hz, in the range of 90 Hz-300 Hz, etc.).

In some examples, the LED(s) 512 may be activated for a period of time $\Delta T_{LIGHT}$ 612 that at least partially overlaps with the period of time $\Delta T_{CAM}$ 608 the shutter of the camera 510 is open. In some examples, the period of time $\Delta T_{LIGHT}$ 612 may be less than $\Delta T_{CAM}$ 608, which may be due to sensor latency $\Delta T_{SL}$ 614.

Figure 7:
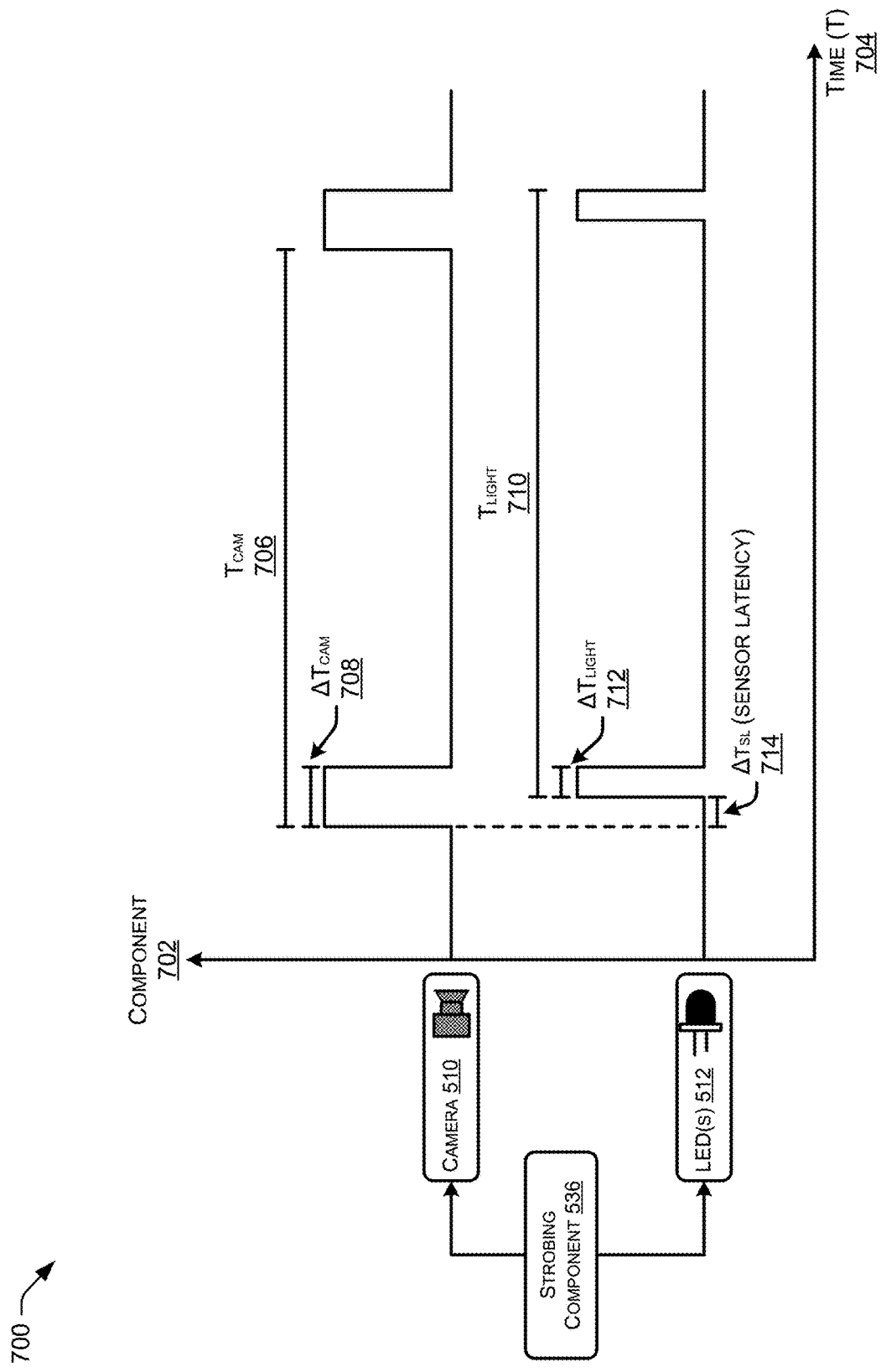
FIG. 7 illustrates another example timing diagram for strobing infrared or near-infrared light from an LED and a camera shutter at respective strobe frequencies.

FIG. 7 illustrates another example timing diagram 700 for strobing infrared (IR) or near-infrared (NIR) light from an LED 512 and a camera 510 shutter at respective strobe frequencies. As illustrated, the strobing component 536 may cause the strobing of the camera 510 shutter and the LED 512 at the same frequency. Because IR and NIR light is not visible to humans, there is no concern of emitting light by the LED(s) 512 at frequencies that are seizure inducing. Accordingly, the camera 510 may open and close the shutter according to a first frequency defined by a time period of $T_{CAM}$ 606, and is pulsed, or has its shutter open, for a $\Delta T_{CAM}$ 608. In instances where the LED(s) 512 emits IR or NIR light, the LED(s) 512 may also be strobed according to a same frequency that is defined by a time period of $T_{LIGHT}$ 710 with a sensor latency from the initiation of $T_{CAM}$ 706 of $\Delta T_{SL}$ 714. Additionally, the LED(s) 512 may have an emit time, or pulse time, of $\Delta T_{LIGHT}$ 712. In various examples, the LED(s) 512 may emit light during at least a portion of time $\Delta T_{CAM}$ 708 when the shutter of the camera 510 is open.

Figure 8:
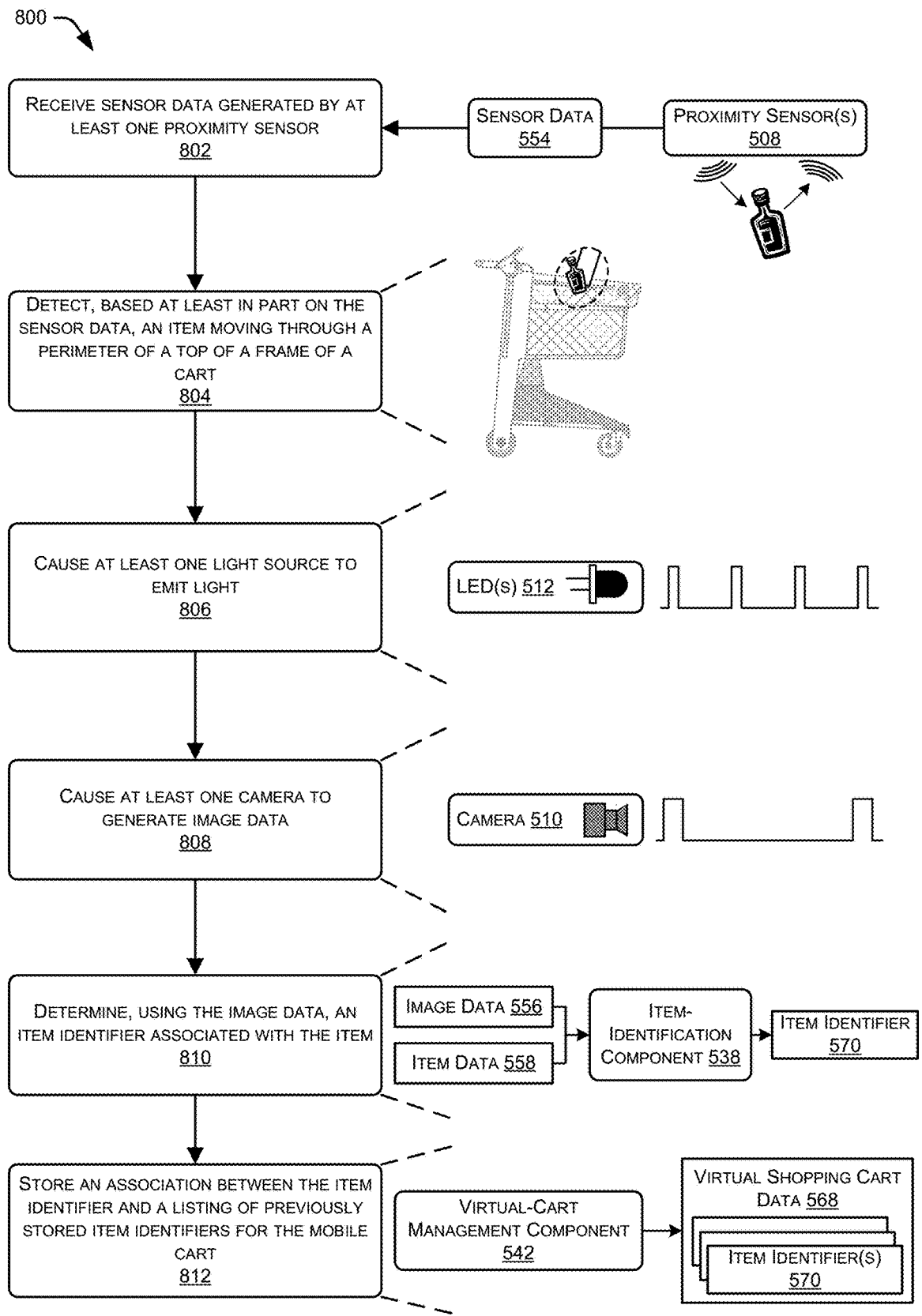
FIG. 8 illustrates a flow diagram of an example process for an item-identifying cart to identify an item placed in the cart.

FIG. 8 illustrates a flow diagram of an example process for an item-identifying cart to identify an item placed in the cart.

The process 800 discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

At 802, the processor(s) 502 of the cart 104 may receive sensor data 554 generated by at least one proximity sensor 508, such as a ToF sensor, a PIR sensor, and/or another proximity sensor 508. At 804, the processor(s) 502 of the cart 104 may detect, based at least in part on the sensor data 554, an item 106 moving through a perimeter of a top of a frame of the cart 104.

At 806, the processor(s) 502 of the cart 104 may cause at least one light source to emit light. For instance, the processor(s) 502 of the cart 104 may cause the strobing component 536 to activate and deactivate (or pulse) an LED 512 at a particular frequency. In some instances, the LED 512 may be all LEDs 512 on the cart 512, multiple LEDs 512, and/or a single LED 512 (such as an LED 512 in a capture assembly 134 that includes a camera 510 with a FOV that includes the item 106).

At 808, the processor(s) 502 of the cart 104 may cause at least one camera 510 to generate image data 556. For instance, the processor(s) 502 of the cart 104 may cause the strobing component 536 to open and close the camera shutter at a particular frequency for predefined exposure periods.

At 810, the processor(s) 502 of the cart 104 may determine, using the image data 556, an item identifier 570 associated with the item 106. For instance, the item-identification component 538 may extract feature data from the image data 558, and compare the feature data to representations of items in item data 558 for items 106 offered for acquisition in the facility 102. In some instances, the item data 556 that corresponds to the feature data for the item 106 in the image data 556 with the highest confidence level data 562 may have its respective item identifier 570 selected.

At 812, the processor(s) 502 of the cart 104 may store an association between the item identifier 570 and a listing of previously stored item identifiers 570 for the mobile cart 104. For instance, the virtual-cart management component 542 may determine that the user 108 added an item 106 to the cart 104, and add an item identifier 570 for the item 106 (or items), and also an item quaintly data 572 if multiple items were added.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

Figure 9:
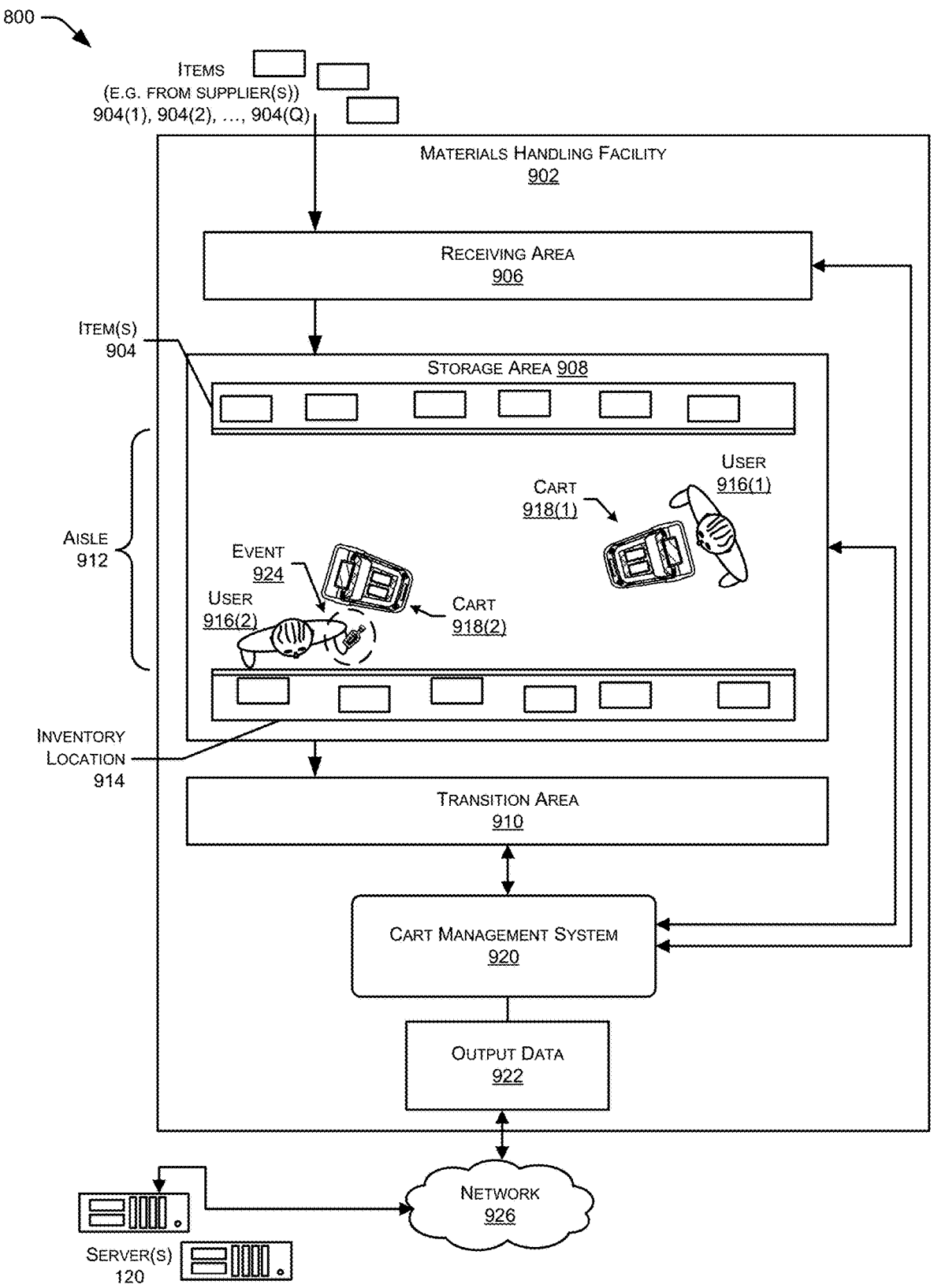
FIG. 9 is a block diagram of an example materials handling facility that includes item-identifying carts and a cart management system configured to generate output regarding events occurring in the cart using sensor data.

FIG. 9 is a block diagram 900 of an example materials handling facility 902 that includes item-identifying carts and a cart management system configured to generate output regarding events occurring in the cart using sensor data. However, the following description is merely one illustrative example of an industry and environment in which the techniques described herein may be utilized.

An implementation of a materials handling facility 902 (e.g., facility 102) configured to store and manage inventory items is illustrated in FIG. 9. A materials handling facility 902 (facility) comprises one or more physical structures or areas within which one or more items 904(1), 904(2), . . . , 904(Q) (generally denoted as 904) may be held. As used in this disclosure, letters in parenthesis such as "(Q)" indicate an integer result. The items 904 comprise physical goods, such as books, pharmaceuticals, repair parts, electronic gear, groceries, and so forth.

The facility 902 may include one or more areas designated for different functions with regard to inventory handling. In this illustration, the facility 902 includes a receiving area 906, a storage area 908, and a transition area 910. The receiving area 906 may be configured to accept items 904, such as from suppliers, for intake into the facility 902. For example, the receiving area 906 may include a loading dock at which trucks or other freight conveyances unload the items 904.

The storage area 908 is configured to store the items 904. The storage area 908 may be arranged in various physical configurations. In one implementation, the storage area 908 may include one or more aisles 912. The aisles 912 may be configured with, or defined by, inventory locations 914 on one or both sides of the aisle 912. The inventory locations 914 may include one or more of shelves, racks, cases, cabinets, bins, floor locations, or other suitable storage mechanisms for holding or storing the items 904. The inventory locations 914 may be affixed to the floor or another portion of the facility's structure, or may be movable such that the arrangements of aisles 912 may be reconfigurable. In some implementations, the inventory locations 914 may be configured to move independently of an outside operator. For example, the inventory locations 914 may comprise a rack with a power source and a motor, operable by a computing device to allow the rack to move from one location within the facility 902 to another.

One or more users 916(1), 916(2), . . . , 916(U), carts 918(1), 918(2), . . . , 918(T) (generally denoted as 918) or other material handling apparatus may move within the facility 902. For example, the users 916 may move about within the facility 902 to pick or place the items 904 in various inventory locations 914, placing them on the carts 918 for ease of transport. An individual cart 918 is configured to carry or otherwise transport one or more items 904. For example, a cart 918 may include a basket, a cart, a bag, and so forth. In other implementations, other agencies such as robots, forklifts, cranes, aerial drones, and so forth, may move about the facility 902 picking, placing, or otherwise moving the items 904.

One or more sensors may be configured to acquire information in the facility 902. The sensors in the facility 902 may include sensors fixed in the environment (e.g., ceiling-mounted cameras) or otherwise, such as sensors in the possession of users (e.g., mobile phones, tablets, etc.) or sensors mounted on the carts 918. The sensors may include, but are not limited to, cameras, weight sensors (e.g., in the bottom of the carts 918), radio frequency (RF) receivers, temperature sensors, humidity sensors, vibration sensors, and so forth. The sensors may be, in some examples, in or on the cart 918 or another location in the facility 902. In one example, the bottom of a basket of the cats 918 may include weight sensors configured to determine a weight of the items 904 placed thereupon.

During operation of the facility 902, the sensors may be configured to provide information suitable for identifying the movement of items 904 or other occurrences within the cart 918. For example, a series of images acquired by a camera may indicate removal of an item 904 from a particular cart 918 by one of the users 916 and/or placement of the item 904 on or at least partially within one of the carts 918.

While the storage area 908 is depicted as having one or more aisles 912, inventory locations 914 storing the items 904, sensors, and so forth, it is understood that the receiving area 906, the transition area 910, or other areas of the facility 902 may be similarly equipped. Furthermore, the arrangement of the various areas within the facility 902 is depicted functionally rather than schematically. For example, multiple different receiving areas 906, storage areas 908, and transition areas 910 may be interspersed rather than segregated in the facility 902.

The carts 918 may include, or be coupled to, a cart management system 920 (e.g., cart management system 530). The cart management system 920 is configured to identify interactions with and between users 916 and carts 918, in one or more of the receiving area 906, the storage area 908, or the transition area 910. These interactions may include one or more events 924. For example, events 924 may include placing of an item 904 in a cart 918, returning of an item 904 from the cart 918 to an inventory location 914, and so forth. Other events 924 involving users 916 may include the user 916 providing authentication information in the facility 902, using a computing device at the facility 902 to authenticate identity to the cart management system 920, and so forth.

By determining the occurrence of one or more of the events 924, the cart management system 920 may generate output data 922. The output data 922 comprises information about the event 924. For example, where the event 924 comprises an item 904 being removed from, or placed in, a cart 918, the output data 922 may comprise an item identifier indicative of the particular item 904 that was removed from, or placed in, the cart 918, a quantity of the item 904, a user identifier of a user that removed the item 904, and/or other output data 922.

The cart management system 920 may use one or more automated systems to generate the output data 922. For example, an artificial neural network, one or more classifiers, or other automated machine learning techniques may be used to process the sensor data and/or image data from the one or more sensors to generate output data 922. The automated systems may operate using probabilistic or non-probabilistic techniques. For example, the automated systems may use a Bayesian network. In another example, the automated systems may use support vector machines to generate the output data 922 or the tentative results. The automated systems may generate confidence level data that provides information indicative of the accuracy or confidence that the output data 922 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 135%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 904 may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 916 may pick an item 904(1) such as a perfume bottle that is generally cubical in shape from the inventory location 914. Other items 904 at nearby inventory locations 914 may be predominately spherical. Based on the difference in shape (cube vs. sphere) from the adjacent items, and the correspondence in shape with the previously stored image of the perfume bottle item 904(1) (cubical and cubical), the confidence level that the user 108 has picked up the perfume bottle item 904(1) is high.

In some situations, the automated techniques may be unable to generate output data 922 with a confidence level above a threshold result. For example, the automated techniques may be unable to distinguish which item 904 in large a group of items a user 916 has picked up from the inventory location 914 and placed in the cart 918. In other situations, it may be desirable to provide human confirmation of the event 924 or of the accuracy of the output data 922. For example, some items 904 may be deemed age restricted such that they are to be handled only by users 916 above a minimum age threshold.

In instances where human confirmation is desired, sensor data associated with an event 924 may be processed to generate inquiry data. The inquiry data may include a subset of the sensor data associated with the event 924. The inquiry data may also include one or more of one or more tentative results as determined by the automated techniques, or supplemental data. The subset of the sensor data may be determined using information about the one or more sensors. The subset of the sensor data may include images that may show the item 904 being placed in, or removed from, the cart 918. The subset of the sensor data may also omit images from other cameras that did not have that item 904 in the field of view. The field of view may comprise a portion of the scene in the cart 918 that the camera is able to generate sensor/image data about.

Continuing the example, the subset of the sensor data may comprise a video clip acquired by one or more cameras having a field of view that includes the item 904. The tentative results may comprise the "best guess" as to which items 904 may have been involved in the event 924. For example, the tentative results may comprise results determined by the automated system that have a confidence level above a minimum threshold.

The facility 902 may be configured to receive different kinds of items 904 from various suppliers and to store them until a customer orders or retrieves one or more of the items 904. A general flow of items 904 through the facility 902 is indicated by the arrows of FIG. 9. Specifically, as illustrated in this example, items 904 may be received from one or more suppliers, such as manufacturers, distributors, wholesalers, and so forth, at the receiving area 906. In various implementations, the items 904 may include merchandise, commodities, perishables, or any suitable type of item 904, depending on the nature of the enterprise that operates the facility 902. The receiving of the items 904 may comprise one or more events 924 for which the cart management system 920 may generate output data 922.

Upon being received from a supplier at receiving area 906, the items 904 may be prepared for storage. For example, items 904 may be unpacked or otherwise rearranged. An inventory management system of the facility 902 may include one or more software applications executing on a computer system to provide inventory management functions based on the events 924 associated with the unpacking or rearrangement. These inventory management functions may include maintaining information indicative of the type, quantity, condition, cost, location, weight, or any other suitable parameters with respect to the items 904. The items 904 may be stocked, managed, or dispensed in terms of countable, individual units or multiples, such as packages, cartons, crates, pallets, or other suitable aggregations. Alternatively, some items 904, such as bulk products, commodities, and so forth, may be stored in continuous or arbitrarily divisible amounts that may not be inherently organized into countable units. Such items 904 may be managed in terms of measurable quantity such as units of length, area, volume, weight, time, duration, or other dimensional properties characterized by units of measurement. Generally speaking, a quantity of an item 904 may refer to either a countable number of individual or aggregate units of an item 904 or a measurable amount of an item 904, as appropriate.

After arriving through the receiving area 906, items 904 may be stored within the storage area 908. In some implementations, like items 904 may be stored or displayed together in the inventory locations 914 such as in bins, on shelves, hanging from pegboards, and so forth. In this implementation, all items 904 of a given kind are stored in one inventory location 914. In other implementations, like items 904 may be stored in different inventory locations 914. For example, to optimize retrieval of certain items 904 having frequent turnover within a large physical facility 902, those items 904 may be stored in several different inventory locations 914 to reduce congestion that might occur at a single inventory location 914.

When a customer order specifying one or more items 904 is received, or as a user 916 progresses through the facility 902, the corresponding items 904 may be selected or "picked" from the inventory locations 914 containing those items 904. In various implementations, item picking may range from manual to completely automated picking. For example, in one implementation, a user 916 may have a list of items 904 they desire and may progress through the facility 902 picking items 904 from inventory locations 914 within the storage area 908, and placing those items 904 into a cart 918. In other implementations, employees of the facility 902 may pick items 904 using written or electronic pick lists derived from customer orders. These picked items 904 may be placed into the cart 918 as the employee progresses through the facility 902. Picking may comprise one or more events 924, such as the user 916 in moving to the inventory location 914, retrieval of the item 904 from the inventory location 914, and so forth.

After items 904 have been picked, they may be processed at a transition area 910. The transition area 910 may be any designated area within the facility 902 where items 904 are transitioned from one location to another or from one entity to another. For example, the transition area 910 may be a packing station within the facility 902. When the item 904 arrives at the transition area 910, the items 904 may be transitioned from the storage area 908 to the packing station. Information about the transition may be maintained by the cart management system 920 using the output data 922 associated with those events 924.

In another example, if the items 904 are departing the facility 902 a list of the items 904 may be used by the cart management system 920 to transition responsibility for, or custody of, the items 904 from the facility 902 to another entity. For example, a carrier may accept the items 904 for transport with that carrier accepting responsibility for the items 904 indicated in the list. In another example, a customer may purchase or rent the items 904 and remove the items 904 from the facility 902.

The cart management system 920 may access or generate sensor data about the items 904, the users 916, the carts 918, and so forth. The sensor data may be acquired by one or more of the sensors, data provided by other systems, and so forth. For example, the sensors may include cameras configured to acquire image data of items 904 placed in the carts 918. The image data may comprise still images, video, or a combination thereof. The image data may be processed by the cart management system 920 to determine an item identifier for the items 904, a listing of items in the cart 918 for a user 916, and so forth. As used herein, the identity of the user of a cart 918 may represent a unique identifier of the user (e.g., name, number associated with user, username, etc.), an identifier that distinguishes the user amongst other users being identified with the environment, or the like.

The cart management system 920, or systems coupled thereto, may be configured to identify the user 916. In one implementation, this determination may comprise comparing sensor data with previously stored identity data. For example, the user 916 may be identified by showing their face to a facial recognition system, by presenting a token carrying authentication credentials, providing a fingerprint, scanning a barcode or other type of unique identifier upon entering the facility, and so forth. Identity of the user 916 may be determined before, during, or after entry to the facility 902 and/or interaction with a cart 918. Determination of the user's 916 identity may comprise comparing sensor data associated with the user 916 in the facility 902 and/or with the cart 918 to previously stored user data. In some examples, the output data 922 may be transmitted over a network 926 to server(s) 120.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A mobile cart configured for travel on a surface, the mobile cart comprising:
   at least one wheel caster configured to cause the mobile cart to travel on the surface;
   a frame comprising:
      a bottom defining a quadrilateral shape;
      four sides protruding upward from the bottom according to the quadrilateral shape, the bottom and four sides defining an interior cavity of the frame; and
      a top having a perimeter defining an opening to the interior cavity to receive items placed in the interior cavity, the top of the frame being disposed in a substantially horizontal plane;
   a bag located in the interior cavity of the frame to hold items;
   a first capture assembly coupled to the frame proximate to a first corner of the perimeter and angled such that a first optical axis of the first capture assembly is directed upward from the substantially horizontal plane, the first capture assembly comprising a first time-of-flight (ToF) sensor, a first camera, and a first light emitting diode (LED);
   a second capture assembly coupled to the frame proximate to a second corner of the perimeter and angled such that a second optical axis of the second capture assembly is directed upward from the substantially horizontal plane, the second capture assembly comprising a second ToF sensor, a second camera, and a second LED;
   a third capture assembly coupled to the frame proximate to a third corner of the perimeter and angled such that a third optical axis of the third capture assembly is directed upward from the substantially horizontal plane, the third capture assembly comprising a third ToF sensor, a third camera, and a third LED;
   a fourth capture assembly coupled to the frame proximate to a fourth corner of the perimeter and angled such that a fourth optical axis of the fourth capture assembly is directed upward from the substantially horizontal plane, the fourth capture assembly comprising a fourth ToF sensor, a fourth camera, and a fourth LED,
   wherein:
      the first ToF sensor, the second ToF sensor, the third ToF sensor, and the fourth ToF sensor are configured to generate sensor data indicating movement of items above the top of the frame;
      the first camera, the second camera, the third camera, and the fourth camera are configured to generate image data representing items moved above the top of the frame; and
      the first LED, second LED, third LED, and fourth LED are configured, when activated, to emit light towards the interior of the perimeter;
   one or more processors; and
   one or more computer-readable media storing computer-executable instructions that, when executed, cause the one or more processors to:
      receive sensor data generated by at least one of the first ToF sensor, the second ToF sensor, the third ToF sensor, or the fourth ToF sensor;
      detect, based at least in part on the sensor data, an item moving above the top of the frame prior to the item being placed into the bag;
      at least partly responsive to detecting the movement of the item:
         cause at least one of the first LED, the second LED, the third LED, or the fourth LED to emit light; and
         cause at least one of the first camera, the second camera, the third camera, or the fourth camera to generate image data of the item above superior to the perimeter of the top of the frame and prior to the item being placed into the bag;
      determine, using the image data, an item identifier associated with the item; and
      store an association between the item identifier and a listing of previously stored item identifiers for the mobile cart.

2. The mobile cart of claim 1, wherein:
   the first camera has a first field-of-view (FOV), the second camera has a second FOV, the third camera has a third FOV, and the fourth camera has a fourth FOV; and
   the first FOV, second FOV, third FOV, and fourth FOV at least partially overlap at a location associated with a centroid of the quadrilateral.

3. The mobile cart of claim 1, comprising further computer-executable instructions that, when executed by the one or more processors, cause the one or more processors to:
   cause a camera shutter associated with the first camera to open and close at a first frequency; and
   cause the first LED to activate and deactivate at a second frequency, wherein the second frequency is at least three times that of the first frequency.

4. A mobile apparatus comprising:
   a frame comprising:
      a bottom having a perimeter;
      one or more sides coupled to and extending up from at least a portion of the perimeter of the bottom, the bottom and the one or more sides defining an interior cavity; and
      a top having a perimeter that defines an opening to the interior cavity;
   a proximity sensor coupled to the frame and configured to detect objects above the perimeter of the top of the frame;

a light source coupled to the frame and configured to, when activated, emit light toward an interior of the perimeter of the top of the frame;

an imaging device coupled to the frame and angled such that an optical axis of the imaging device is directed above the perimeter of the top of the frame;

a wheel frame having a top and a bottom, the wheel frame coupled to the frame and disposed below the bottom of the frame;

a vertical member extending downward from the bottom of the frame to the top of the wheel frame;

at least one wheel caster coupled to the bottom of the wheel frame; and a battery pack assembly coupled to the top of the wheel frame and disposed below the bottom of the frame, the battery pack assembly comprising one or more batteries that provide power to the proximity sensor, the light source, and the imaging device.

5. The mobile apparatus of claim 4, wherein the imaging device comprises a first imaging device having a first viewing frustum, further comprising:

a second imaging device coupled to the frame and having a second viewing frustum directed above the perimeter of the top of the frame and towards the interior of the perimeter;

a third imaging device coupled to the frame and having a third viewing frustum directed above the perimeter of the top of the frame and towards the interior of the perimeter; and a fourth imaging device coupled to the frame and having a fourth viewing frustum directed above the perimeter of the top of the frame and towards the interior of the perimeter, wherein:

the first imaging device has a first field-of-view (FOV), the second imaging device has a second FOV, the third imaging device has a third FOV, and the fourth imaging device has a fourth FOV; and the first FOV, second FOV, third FOV, and fourth FOV at least partially overlap at a location above a centroid of a shape defined by the perimeter of the top of the frame.

6. The mobile apparatus of claim 4, further comprising at least one power cable disposed in at least one channel of the frame, wherein the at least one power cable provides power to at least one of the proximity sensor, the light source, or the imaging device.

7. The mobile apparatus of claim 4, further comprising:

one or more processors; and one or more computer-readable media storing computer-executable instructions that, when executed, cause the one or more processors to:

detect, at least partly using the proximity sensor, an item above the perimeter of the top of the frame;

cause the light source to emit light;

cause the imaging device to generate image data representing the item;

determine, using the image data, an item identifier associated with the item; and store an indication of the item identifier.

8. The mobile apparatus of claim 7, further comprising computer-executable instructions that, when executed by the one or more processors, cause the one or more processors to:

cause a camera shutter associated with the imaging device to open and close at a first frequency; and cause the light source to activate and deactivate at a second frequency, wherein the second frequency is greater than the first frequency.

9. The mobile apparatus of claim 8, wherein the second frequency is greater than or equal to 90 Hz.

10. The mobile apparatus of claim 7, further comprising:

a display coupled to the frame; and further executable instructions that, when executed by the one or more processors, cause the one or more processors to:

determine, using the image data, a plurality of possible item identifiers of the item;

present, on the display, a user interface comprising at least a portion of the plurality of possible item identifiers; and receive response data indicative of a selection of one of the plurality of possible item identifiers, the one of the plurality of possible item identifiers corresponding to the item identifier.

11. The mobile apparatus of claim 7, further comprising:

a microphone;

a loudspeaker; and further executable instructions that, when executed by the one or more processors, cause the one or more processors to:

determine, using the image data, a plurality of possible item identifiers of the item;

cause the loudspeaker to output audio that includes a request to identify the item;

generate, using the microphone, audio data represent an utterance of a user; and determine, using the audio data, that the utterance indicates the item identifier.

12. A mobile apparatus comprising:

a frame comprising:

a bottom having a perimeter;

one or more sides coupled to and extending up from at least a portion of the perimeter of the bottom, the bottom and the one or more sides defining an interior cavity; and a top having a perimeter that defines an opening to the interior cavity, the top of the frame being disposed in a plane;

a bag located in the interior cavity of the frame to hold items;

a light source coupled to the frame and configured to, when activated, emit light toward an interior of the perimeter of the top of the frame;

an imaging device coupled to the frame and angled such that an optical axis of the imaging device is directed above the top of the frame;

one or more processors; and one or more computer-readable media storing computer-executable instructions that, when executed, cause the one or more processors to:

cause the imaging device to generate image data representing an item above the perimeter of prior to the item being placed into the bag;

determine, using the image data, an item identifier associated with the item; and store an indication of the item identifier.

13. The mobile apparatus of claim 12, further comprising:
a proximity sensor coupled to the frame and configured to detect objects above the top of the frame; and
further computer-executable instructions that, when executed, cause the one or more processors to:
receive sensor data generated by the proximity sensor; and
detect, at least partly using the sensor data, the item above the perimeter of the top of the frame,
wherein causing the imaging device to generate image data is performed at least partly responsive to detecting the item above the perimeter of the top of the frame.

14. The mobile apparatus of claim 12, wherein causing the imaging device to generate the image data includes causing a camera shutter of the imaging device to open and close at a first frequency, comprising further computer-executable instructions that, when executed, cause the one or more processors to causing the light source to activate and deactivate at a second frequency, wherein the second frequency is greater than the first frequency.

15. The mobile apparatus of claim 14, wherein the second frequency is greater than or equal to 90 Hz.

16. The mobile apparatus of claim 12, wherein the imaging device comprises a first imaging device having a first viewing frustum, further comprising:
a second imaging device coupled to the frame and having a second viewing frustum directed above the perimeter of the top of the frame and towards the interior of the perimeter;
wherein:
the first imaging device has a first field-of-view (FOV) and the second imaging device has a second FOV; and
the first FOV and the second FOV at least partially overlap at a location above a centroid of a shape defined by the perimeter of the top of the frame.

17. The mobile apparatus of claim 12, further comprising:
a vertical member extending downward from the bottom of the frame to a top of a wheel frame;
at least one wheel caster coupled to a bottom of the wheel frame; and
a battery pack assembly coupled to the top of the wheel frame and disposed below the bottom of the frame, the battery pack assembly comprising one or more batteries that provide power to the one or more processors, the light source, and the imaging device.

18. The mobile apparatus of claim 12, further comprising:
a weight sensor configured to generate weight data associated with the item; and
further computer executable instructions that, when executed by the one or more processors, cause the one or more processors to:
determine, using the weight data, that the item was placed into the frame of the mobile apparatus,
wherein storing the indication of the item identifier is based at least in part on determining that the item was placed into the frame.

19. The mobile apparatus of claim 12, further comprising:
a display coupled to the frame; and
further executable instructions that, when executed by the one or more processors, cause the one or more processors to:
determine, using the image data, a plurality of possible item identifiers of the item;
present, on the display, a user interface comprising at least a portion of the plurality of possible item identifiers; and
receive response data indicative of a selection of one of the plurality of possible item identifiers, the one of the plurality of possible item identifiers corresponding to the item identifier.

20. The mobile apparatus of claim 12, wherein the frame further comprises:
a hook supporting the bag,
wherein the bag occludes at least a portion of a field-of-view (FOV) of the imaging device.

* * * * *